US012453487B2

(12) United States Patent
Majumdar et al.

(10) Patent No.: US 12,453,487 B2
(45) Date of Patent: Oct. 28, 2025

(54) SYSTEMS AND METHODS USING NUCLEAR MAGNETIC RESONANCE (NMR) SPECTROSCOPY TO EVALUATE PAIN AND DEGENERATIVE PROPERTIES OF TISSUE

(71) Applicant: THE REGENTS OF THE UNIVERSITY OF CALIFORNIA, Oakland, CA (US)

(72) Inventors: Sharmila Majumdar, Alameda, CA (US); John Kurhanewicz, South San Francisco, CA (US); Jeffrey C. Lotz, San Mateo, CA (US); David S. Bradford, Sausalito, CA (US); Kayvan Keshari, Stockton, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 765 days.

(21) Appl. No.: 17/372,103

(22) Filed: Jul. 9, 2021

(65) Prior Publication Data

US 2022/0142498 A1   May 12, 2022

Related U.S. Application Data

(63) Continuation of application No. 15/866,312, filed on Jan. 9, 2018, now Pat. No. 11,096,603, which is a
(Continued)

(51) Int. Cl.
*A61B 5/00*    (2006.01)
*A61B 5/055*   (2006.01)
(Continued)

(52) U.S. Cl.
CPC ............ *A61B 5/055* (2013.01); *A61B 5/4566* (2013.01); *A61B 5/4824* (2013.01); *G01N 24/08* (2013.01);
(Continued)

(58) Field of Classification Search
CPC ...... A61B 5/055; A61B 5/4824; A61B 5/4566
See application file for complete search history.

(56) References Cited

U.S. PATENT DOCUMENTS 4,983,920 A   1/1991   Lampman
5,068,098 A   11/1991  Schweighardt
(Continued)

FOREIGN PATENT DOCUMENTS

JP    S63204143    8/1988
JP    H05509162    12/1993
(Continued)

OTHER PUBLICATIONS

Ford, JC et al., "In vivo Quantitative Characterization of Trabecular Bone by NMR Interferometry and Localized Proton Spectroscopy," Magnetic Resonance in Medicine 1991; 17: pp. 543-551.
(Continued)

*Primary Examiner* — Rajeev P Siripurapu
(74) *Attorney, Agent, or Firm* — O'BANION & RITCHEY LLP; John P. O'Banion

(57) ABSTRACT

A completely non-invasive diagnostic toolset and method to image and localize degeneration and/or pain. Extent of degeneration is determined based on NMR spectroscopy of intervertebral disc tissue. Correlation between NMR spectral regions and at least one of tissue degeneration and pain are made. Accordingly, NMR spectroscopy is used to determine location and/or extent of at least one of degeneration or pain associated with a region of tissue, such as for example in particular disc degeneration, or discogenic pain. NMR spectral peak ratios, such as between N-Acetyl/cho and cho/carb, are acquired and analyzed to predict degree of tissue degeneration and/or pain for: tissue samples using HR-MAS spectroscopy; and larger portions of anatomy such as joint segments such as a spine, using clinical 3T MRI systems with surface head or knee coils; and tissue regions such as
(Continued)

discs within spines of living patients using 3T MRI systems with a surface spine coil.

18 Claims, 14 Drawing Sheets

Related U.S. Application Data continuation of application No. 13/680,612, filed on Nov. 19, 2012, now Pat. No. 9,901,285, which is a continuation of application No. 11/829,847, filed on Jul. 27, 2007, now Pat. No. 8,344,728, which is a continuation-in-part of application No. PCT/US2006/003036, filed on Jan. 30, 2006.

(60) Provisional application No. 60/737,110, filed on Nov. 15, 2005, provisional application No. 60/648,241, filed on Jan. 28, 2005.

(51) Int. Cl.
  *G01N 24/08* (2006.01)
  *G01N 33/68* (2006.01)
  *G01R 33/00* (2006.01)
  *G01R 33/20* (2006.01)
  *G01R 33/44* (2006.01)
  *G01R 33/46* (2006.01)
  *G01R 33/48* (2006.01)
  *G01R 33/483* (2006.01)
  *G01R 33/54* (2006.01)
  G01R 33/465 (2006.01)
  G01R 33/485 (2006.01)

(52) U.S. Cl.
  CPC ............ *G01N 33/68* (2013.01); *G01R 33/00* (2013.01); *G01R 33/20* (2013.01); *G01R 33/44* (2013.01); *G01R 33/46* (2013.01); *G01R 33/4625* (2013.01); *G01R 33/48* (2013.01); *G01R 33/4828* (2013.01); *G01R 33/483* (2013.01); *G01R 33/54* (2013.01); *A61B 5/4514* (2013.01); *A61B 5/4528* (2013.01); *G01R 33/465* (2013.01); *G01R 33/485* (2013.01)

(56) References Cited

U.S. PATENT DOCUMENTS

| | | | |
|---|---|---|---|
| 5,190,039 A | 3/1993 | Takeuchi | |
| 5,201,311 A | 4/1993 | Bottomley | |
| 5,207,715 A | 5/1993 | Fossel | |
| 5,270,651 A | 12/1993 | Wehrli | |
| 5,617,861 A | 4/1997 | Ross | |
| 5,844,097 A | 12/1998 | Cameron, Sr. | |
| 5,903,149 A | 5/1999 | Gonen | |
| 6,018,675 A | 1/2000 | Apkarian | |
| 6,069,478 A | 5/2000 | Hurd | |
| 6,278,891 B1 | 8/2001 | Reiderman | |
| 6,418,335 B2 | 7/2002 | Avrin | |
| 6,472,871 B2 | 10/2002 | Ryner | |
| 6,549,799 B2 | 4/2003 | Bock | |
| 6,552,541 B2 | 4/2003 | Nauerth | |
| 6,617,169 B2 | 9/2003 | Ke | |
| 6,639,405 B2 | 10/2003 | Liu | |
| 6,674,282 B2 | 1/2004 | Pines | |
| 6,683,455 B2 | 1/2004 | Ebbels | |
| 6,686,348 B2 | 2/2004 | De Nanteuil | |
| 6,795,567 B1 | 9/2004 | Cham | |
| 6,835,572 B1 | 12/2004 | Mountford | |
| 6,836,114 B2 | 12/2004 | Reddy | |
| 6,943,033 B2 | 9/2005 | Van Zijl | |
| 6,987,997 B1 | 1/2006 | Hurd | |
| 7,027,054 B1 | 4/2006 | Cheiky | |
| 7,042,214 B2 | 5/2006 | Cunningham | |
| 7,050,618 B2 | 5/2006 | Belykh | |
| 7,116,104 B2 | 10/2006 | Reddy | |
| 7,123,009 B1 | 10/2006 | Scott | |
| 7,181,348 B2 | 2/2007 | Wishart | |
| 7,184,813 B1 | 2/2007 | Hurd | |
| 7,288,521 B2 | 10/2007 | Franco | |
| 7,319,784 B2 | 1/2008 | Ryner | |
| 7,323,871 B2 | 1/2008 | Foo | |
| 7,352,474 B2 | 4/2008 | Bachim | |
| 7,411,396 B1 | 8/2008 | Schirmer | |
| 7,499,745 B2 | 3/2009 | Littrup | |
| 7,514,074 B2 | 4/2009 | Pittenger | |
| 7,676,254 B2 | 3/2010 | Siddall | |
| 7,705,596 B2 | 4/2010 | Witschey | |
| 7,741,844 B2 | 6/2010 | Hancu | |
| 7,749,275 B2 | 7/2010 | Lambrecht | |
| 7,831,293 B2 | 11/2010 | Ellis | |
| 7,916,909 B2 | 3/2011 | Khazen | |
| 7,940,264 B2 | 5/2011 | Jojic | |
| 7,983,732 B2 | 7/2011 | Chen | |
| 8,018,570 B2 | 9/2011 | Kameyama | |
| 8,076,936 B2 | 12/2011 | Borthakur | |
| 8,208,709 B2 | 6/2012 | Ding | |
| 8,223,143 B2 | 7/2012 | Dastmalchi | |
| 8,233,681 B2 | 7/2012 | Aylward | |
| 8,263,043 B2 | 9/2012 | Ahrens | |
| 8,344,728 B2 | 1/2013 | Majumdar | |
| 8,358,818 B2 | 1/2013 | Miga | |
| 8,405,836 B2 | 3/2013 | Yablon | |
| 8,478,380 B2 | 7/2013 | Soher | |
| 8,553,037 B2 | 10/2013 | Smith | |
| 8,569,482 B2 | 10/2013 | Kuppusamy | |
| 8,569,485 B2 | 10/2013 | Yamakawa | |
| 8,609,334 B2 | 12/2013 | Buser | |
| 8,615,285 B2 | 12/2013 | Ehman | |
| 8,668,647 B2 | 3/2014 | Eskandari | |
| 8,690,057 B2 | 4/2014 | Schoening | |
| 8,723,516 B2 | 5/2014 | Wheaton | |
| 8,761,860 B2 | 6/2014 | Peacock, III | |
| 8,798,351 B2 | 8/2014 | Ding | |
| 8,825,131 B2 | 9/2014 | Peacock, III | |
| 8,838,201 B2 | 9/2014 | Mori | |
| 8,965,094 B2 | 2/2015 | Peacock, III | |
| 9,121,889 B2 | 9/2015 | Tuchman | |
| 9,138,145 B2 | 9/2015 | Klimenko | |
| 9,161,735 B2 | 10/2015 | Bradford | |
| 9,280,718 B2 | 3/2016 | Claude | |
| 9,345,421 B2 | 5/2016 | Peacock, III | |
| 9,392,959 B2 | 7/2016 | Peacock, III | |
| 9,702,900 B2 | 7/2017 | Yacoby | |
| 9,724,013 B2 | 8/2017 | Peacock, III | |
| 9,808,177 B2 | 11/2017 | Claude | |
| 9,885,766 B2 | 2/2018 | Avdievich | |
| 9,901,285 B2 | 2/2018 | Majumdar | |
| 10,045,711 B2 | 8/2018 | Peacock, III | |
| 10,123,759 B2 | 11/2018 | Bradford | |
| 10,251,578 B2 | 4/2019 | Peacock, III | |
| 10,285,622 B2 | 5/2019 | Peacock, III | |
| 10,391,142 B2 | 8/2019 | Buser | |
| 10,517,504 B2 | 12/2019 | Claude | |
| 10,646,135 B2 | 5/2020 | Peacock, III | |
| 10,782,373 B2 | 9/2020 | Altbach | |
| 11,096,603 B2 | 8/2021 | Majumdar | |
| 11,179,057 B2 | 11/2021 | Peacock, III | |
| 11,564,619 B2 | 1/2023 | Lotz | |
| 11,633,124 B2 | 4/2023 | Peacock, III | |
| 11,844,601 B2 | 12/2023 | Peacock, III | |
| 12,097,020 B2 | 9/2024 | Peacock, III | |
| 2001/0003423 A1 | 6/2001 | Wald | |
| 2002/0037251 A1 | 3/2002 | Driehuys | |
| 2004/0006376 A1 | 1/2004 | Falci | |
| 2004/0092809 A1* | 5/2004 | DeCharms | A61B 5/0048 600/410 |
| 2004/0214348 A1 | 10/2004 | Nicholson | |
| 2005/0020905 A1 | 1/2005 | Siddall | |
| 2005/0024051 A1 | 2/2005 | Doddrell | |
| 2005/0054910 A1 | 3/2005 | Tremblay | |

(56) References Cited

U.S. PATENT DOCUMENTS

| | | |
|---|---|---|
| 2005/0240104 A1 | 10/2005 | Shim |
| 2005/0251025 A1 | 11/2005 | Hancu |
| 2006/0074292 A1 | 4/2006 | Thomson |
| 2007/0133852 A1 | 6/2007 | Collins |
| 2007/0167729 A1 | 7/2007 | Mistretta |
| 2007/0249928 A1 | 10/2007 | Blezek |
| 2007/0253910 A1 | 11/2007 | Ahrens |
| 2008/0039710 A1 | 2/2008 | Majumdar |
| 2008/0220530 A1 | 9/2008 | Bahn |
| 2008/0226148 A1 | 9/2008 | Gu |
| 2009/0034812 A1 | 2/2009 | Nowinski |
| 2009/0076481 A1 | 3/2009 | Stegmann |
| 2009/0134869 A1 | 5/2009 | Lee |
| 2009/0191131 A1 | 7/2009 | Fossheim |
| 2009/0232378 A1 | 9/2009 | Nakamura |
| 2009/0261823 A1 | 10/2009 | Yu |
| 2010/0086185 A1 | 4/2010 | Weiss |
| 2010/0121210 A1 | 5/2010 | Lindner |
| 2010/0136588 A1 | 6/2010 | Colgin |
| 2010/0166278 A1 | 7/2010 | Witschey |
| 2010/0244834 A1 | 9/2010 | Mori |
| 2010/0264920 A1 | 10/2010 | Witschey |
| 2010/0268225 A1 | 10/2010 | Coe |
| 2010/0303358 A1 | 12/2010 | Acharyya |
| 2011/0087087 A1 | 4/2011 | Peacock, III |
| 2011/0230755 A1 | 9/2011 | Macfarlane |
| 2011/0286630 A1 | 11/2011 | Harder |
| 2012/0155731 A1 | 6/2012 | Weersink |
| 2013/0053658 A1 | 2/2013 | Peacock |
| 2013/0144155 A1 | 6/2013 | Majumdar |
| 2014/0119631 A1 | 5/2014 | Mostafavi |
| 2014/0194364 A1 | 7/2014 | Buser |
| 2015/0119688 A1 | 4/2015 | Peacock, III |
| 2017/0105650 A1 | 4/2017 | Peacock, III |
| 2019/0216418 A1 | 7/2019 | Bradford |
| 2020/0100698 A1 | 4/2020 | Peacock, III |
| 2023/0355167 A1 | 11/2023 | Lotz |

FOREIGN PATENT DOCUMENTS

| | | |
|---|---|---|
| JP | H06503418 | 4/1994 |
| JP | 2003524490 | 8/2003 |
| JP | 2004526130 | 8/2004 |
| JP | 2004528559 | 9/2004 |
| KR | 20110100046 A | 9/2011 |
| WO | 2004099808 | 11/2004 |
| WO | 2006081471 | 8/2006 |
| WO | 2007035906 | 3/2007 |
| WO | 2009058915 | 5/2009 |
| WO | 2009148550 | 12/2009 |
| WO | 2010052629 | 5/2010 |
| WO | 2010117573 | 10/2010 |
| WO | 2011047197 | 4/2011 |
| WO | 2011060237 | 5/2011 |
| WO | 2011146798 | 11/2011 |
| WO | 20110146798 | 11/2011 |
| WO | 2012071566 | 5/2012 |

OTHER PUBLICATIONS

Schiller, J. et al., "Evaluation of Cartilage Composition and Degradation by High-Resolution Magic-Angle Spinning Nuclear Magnetic Resonance" Methods in Molecular Medicine 2004; 101: pp. 267-285.

Cheng, L. L. et al., "Quantitative neuropathology by high resolution magic angle spinning proton magnetic resonance spectroscopy", Proc. Natl. Acad. Sci,.: 94(12), pp. 6408-6413, Jun. 10, 1997.

Boos, Norbert et al., "Quantitative Magnetic Resonance Imaging of the Lumbar Spine—Potential for Investigations of Water Content and Biochemical Composition", SPINE vol. 20, No. 21, pp. 2358-2365, 1995.

Pfirrmann, Christian W. A. et al., "Magnetic Resonance Classification of Lumbar Intervertebral Disc Degeneration", SPINE vol. 26, No. 17, pp. 1873-1878, 2001.

Urban, Jill P.G. et al., "Nutrition of the Intervertebral Disc", SPINE vol. 29, No. 23, pp. 2700-2709, 2004.

Keshari, K. et al.—"Characterization of Intervertebral Disc Degeneration by High-Resolution Magic Angle Spinning (HR-MAS) Spectroscopy"—Magnetic Resonance in Medicine—vol. 53, 2005, pp. 519-527.

European Patent Office, Communication pursuant to Article 94(3) EPC (office action) issued on May 3, 2011 for EPO application No. 06 374 001.8-2319, with claims examined, counterpart to PCT/US2006/03036 claiming priority to U.S. Appl. No. 11/829,847 and U.S. Appl. No. 11/829,847 and related to U.S. Appl. No. 11/829,847, pp. 1-8.

European Patent Office, Extended European Supplementary Search Report (pp. 1-7) issued May 20, 2010 for related European patent application No. EP 06 73 4001.8 and claims searched (pp. 8-10) pp. 1-10.

Haro, H. et al.—"Matrix metalloproteinase-7-dependent release of tumor necrosis factor in a model of herniated disc resorption"—Jour. of Clinical Inv., vol. 105, No. 2, Jan. 2000, pp. 143-150.

Mow, V.C. et al.—"Basic Orthopaedic Biomechanics—Chapter 10—Biomechanics of the Human Spine"—1997, pp. 353-393.

Thompson, J. et al.—"Preliminary Evaluation of a Scheme for Grading the Gross Morphology of the Human Intervertebral Disc"—Spine, vol. 15, 1990, pp. 411-415.

Atridis, J. et al.—"Alterations in the Mechanical Behavior of the Human Lumbar Nucleas Pulposus with Degeneration and Aging"—Jour. of Ortho Research, vol. 15, 1997, pp. 318-322.

Beall, et al.—"NMR Data Handbook for Biomedical Applications"—New York, Pergamon Press, 1984, 11 pages.

Bottomley, P. et al.—"A review of normal tissue hydrogen NMR relaxation times and relaxation mechanisms from 1-100 MHz: Dependence on tissue type, NMR frequency, temperature, species, excision and age"—Med. Phys., vol. 11, No. 4, Jul./Aug. 1984, pp. 425-448.

Lyons, G. et al.—"Biochemical Changes in Intervertebral Disc Degeneration"—Biochimica Biophys Acta, vol. 673, 1981, pp. 443-453.

Maroudas, A.—"The Biology of the Intervertebral Disc"—In: Ghosh, P. et. The Biology of the Intervertebral Disc, vol. II, Chapter 9, 1988.

Pearce, R. et al.—"Degeneration and the Chemical Composition of the Human Lumbar Intervertebral Disc"—Jour. of Ortho. Research, vol. 5, 1987, pp. 198-205.

Tertti, M. et al.—"Disc Degeneration in Magnetic Resonance Imaging: A Comparative Biochemical, Histologic, and Radiologic Study in Cadaver Spines"—Spine, 1991, pp. 629-634.

Chiu, E. et al.—"Magnetic Resonance Imaging Measurement of Relaxation and Water Diffusion in the Human Lumbar Intervertebral Disc Under Compression in Vitro"—Spine, vol. 26, No. 19, 2001, pp. E437-E444.

Gundry, C. et al.—"Magnetic Resonance Imaging of the Musculoskeletal System, Part 8. The Spine, Section 1", Clinical Ortho. and Related Research, vol. 338, May 1997, pp. 275-287.

Gunzburg, R. et al.—"A Cadaveric Study Comparing Discography, Magnetic Resonance Imaging, Histology, and Mechanical Behavior of the Human Lumbar Disc"—Spine, 1991, pp. 417-423.

Modic, M. et al.—"Magnetic Resonance Imaging of Intervertebral Disk Disease"—Radiology, vol. 152, 1984, pp. 103-111.

Modic, M. et al.—"Imaging of Degenerative Disk Disease"—Radiology, vol. 168, 1988, pp. 177-186.

Sether, L. et al.—"Intervertebral Disk: Normal Age-related Changes in MR Signal Intensity"—Radiology, vol. 177, 1990, pp. 385-388.

Nieminen, M. et al.—"Spatial Assessment of Articular Cartilage Proteoglycans with Gd-DTPA-Enhanced T1 Imaging"—Mag. Res. in Med., vol. 48, 2002, pp. 640-648.

Mosher, T. et al.—"Human Articular Cartilage: Influence of Aging and Early Symptomatic Degeneration on the Spatial Variation of T2-Preliminary Findings at 3 T1"—Radiology, vol. 214, 2000, pp. 259-266.

(56) References Cited

OTHER PUBLICATIONS

Burstein, D. et al.—"Diffusion of Small Solutes in Cartilage as Measured by Nuclear Magnetic Resonance (NMR) Spectroscopy and Imaging"—Jour. of Ortho. Res., vol. 11, 1993, pp. 465-478.
Abdulkarim, J. et al.—"Magnetic Resonance Imaging of the Cervical Spine: Frequency of Degenerative Changes in the Intervertebral Disc With Relation to Age"—Clinical Radiology, vol. 58, 2003, pp. 980-984.
Swanson, M. et al.—"Proton HR-MAS Spectroscopy and Quantitative Pathologic Analysis of MRI/3D-MRSI—Targeted Postsurgical Prostate Tissues"—Mag. Resonance in Med., vol. 54, 2003, pp. 944-954.
Schiller, J. et al.—"1H and 13C HR-MAS NMR investigations on native and enzymatically digested bovine nasal cartilage"—Mag. Resonance Mater. in Phy., Biol., and Med., vol. 13, 2001, pp. 19-27.
Carr, H. et al.—"Effects of Diffusion on Free Precession in Nuclear Magnetic Resonance Experiments"—Phys. Review, vol. 94, No. 3, May 1, 1954, pp. 630-638.
Kupce, E.—"Applications of Adiabatic Pulses in Biomolecular Nuclear Magnetic Resonance"—Methods in Enzymology, vol. 338, 2001, pp. 82-111.
Mucci, A. et al.—"1H and 13C nuclear magnetic resonance identification and characterization of components of chondroitin sulfates of various origin"—Carbohydrate Polymers, vol. 41, 2003, pp. 37-45.
Groupille, P. et al.—"Matrix Metalloproteinases: The Clue to Intervertebral Disc Degeneration?"—Spine, vol. 23, No. 14, Jul. 1998, pp. 1612-1626.
Kang, J. et al.—"Towards a Biochemical Understanding of Human Intervertebral Disc Degeneration and Herniation: Contributions of Nitric Oxide, Interleukins, Prostaglandin E2, and Matrix Metalloproteinases"—spine, vol. 22, No. 10, May 15, 1997, pp. 1065-1073.
Weiler, C. et al.—"2002 SSE Award Competition in Basic Science: Expression of major matrix metalloproteinases is associated with intervertebral disc degradation and resorption"—Eur. Spine Jour., vol. 11, 2002, pp. 308-320.
Urban, J. et al.—"The Nucleus of the Intervertebral Disc from Development to Degeneration"—American Zoologist, vol. 40, No. 1, Feb. 2000, pp. 53-61.
Weidenbaum, M. et al.—"Correlating Magnetic Resonance Imaging with the Biochemical Content of the Normal Human Intervertebral Disc"—Jour. of Ortho. Research, vol. 10, 1992, pp. 552-561.
Boos, N. et al.—"Quantitative MR Imaging of Lumbar Intervertebral Disks and Vertebral Bodies: Influence of Diurnal Water Content Variations"—Radiology, vol. 188, 1993, pp. 351-354.
Boos, N. et al.—"Quantitative MR Imaging of Lumbar Intervertebral Discs and Vertebral Bodies: Methodology, Reproducibility, and Preliminary Results"—Mag. Res. Imaging, vol. 12, No. 4, 1994, pp. 577-587.
Chung, C-T. et al. Single photon emission computed tomography (SPECT) for low back pain induced by extension with no root sign. J. Chin. Med. Assoc. vol. 67, pp. 349-354 (2004).
Lusins J.O. et al. SPECT and lumbar MRI in back pain with emphasis on changes in end plates in association with disc degeneration (abstract). J. Neuroimaging, vol. 8, No. 2, pp. 78-82 (1998).
McDonald, M. et al. Use of computer tomography—single-photon emission computed tomography fusion for diagnosing painful facet arthropathy. Neurosurg. Focus, vol. 22, No. 1, E2 (2007).
Mulconrey, D.S. et al. Interobserver reliability in the interpretation of diagnostic lumbar MRI and nuclear imaging. The Spine Journal, vol. 6, pp. 177-184 (2006).
Keshari, K. et al.—Poster and Abstract—"Identification of Chondroitin Sulfate as a Marker for Human Intervertebral Disc Degeneration Using Proton High Resolution Magic Angle Spinning (HR-MAS) Spectroscopy"—The 44th ENC, Mar. 30-Apr. 4, 2003, 22 pages.
Majumdar, S.—Abstract—"Spectroscopic Markers of Disc Degeneration"—downloaded from CRISP website Nov. 23, 2004, 2 pages.
Keshari, K. et al.—"Correlation of HR-MAS Spectroscopy Derived Metabolite Concentrations With Collagen and Proteoglycan Levels and Thompson Grade in the Degenerative Disc"—Spine, vol. 30, No. 23, Dec. 1, 2005, pp. 2683-2688.
European Patent Office, Office Action issued on Apr. 17, 2012 (pp. 1-5) with claims (pp. 6-10), related EP Patent Application No. 06 734 001.8, counterpart to PCT/US2006/003036, claiming priority to U.S. Appl. No. 60/737,110 and U.S. Appl. No. 60/737,110, pp. 1-10.
Japanese Patent Office, Office Action issued on Jun. 14, 2011, related Japenese Patent Application No. 2007-553286, English translation (pp. 1-3), original Japanese Language copy ( pp. 4-5), with claims (pp. 6-16), counterpart to PCT/US2006/003036, claiming priority to 60/737, 110 and U.S. Appl. No. 60/648,241.
The State Intellectual Property Office of the People's Republic of China, Decision of Rejection issued Jul. 26, 2011, related Chinese U.S. Appl. No. 200680009431.8, English translation (pp. 1-5), original Chinese Language copy (pp. 6-8), with claims (pp. 9-11), counterpart to PCT/US2006/003036, claiming priority to U.S. Appl. No. 60/648,241 and U.S. Appl. No. 60/648,241.
Japanese Patent Office, Office Action issued on Jun. 12, 2012 (pp. 1-3) with English-language translation (pp. 4-7) and claims examined (pp. 8-11), related Japanese Patent Application No. 2007-553286, counterpart to PCT/US2006/003036, claiming priority U.S. Appl. No. 60/737,110 and U.S. Appl. No. 60/737,110, pp. 1-11.
Petrantonaki, M. et al., "MRI Technique of the Examination of Trabecular Bone Structure," Current Imaging Review 2005, 1: pp. 35-41.
Freeborn et al., Primary Care Physicians' Use of Lumbar Spine Imaging Tests: Effects of Guidelines and Practice Pattern Feedback. JGIM, Oct. 1997; 12(10): 619-625.
Freemont A J., The cellular pathobiology of the degenerate intervertebral disc and discogenic back pain, (2009) Rheumatol. Jan. 1, 2009:48(1): 5-10, (Advanced access publication Oct. 14, 2008).
Freemont et al., Nerve ingrowth into diseased intervertebral disc in chronic back pain. Lancet Jul. 19, 1997;350 (9072): 178-181.
Freemont, A.J. et al., "Nerve growth factor expression and innervation of the painful intervertebral disc", 2002 J. Pathol. 197: 286-292, online Mar. 21, 2002.
Fritzell et al., Detection of bacterial DNA in painful degenerated spinal discs in patients without signs of clinical infection. Eur Spine J. Dec. 2004; 13(8): 702-706; publ. online May 8, 2004.
GÅrseth et al., Metabolic changes in the cerebrospinal fluid of patients with lumbar disc herniation or spinal stenosis. J Neurosci Res. Sep. 1, 2002;69(5): 692-695.
Giulietti et al., Semiautomated segmentation of the human spine based on echoplanar images. Magn Reson Imaging. Dec. 2011; 29(10):1429-1436.
Gornet et al., Magentic Resonance Spectroscopy (MRS) can identify painful lumbar dics and may facilitate improved clinical outcomes of lumbar surgeries for discogenic pain. Eur Spine J. Apr. 1, 2019;28: 674-6787; published onine on Jan. 4, 2019.
Grunhagen et al., Nutrient supply and intervertebral disc metabolism. J Bone Joint Surg. Apr. 1;88(Suppl 2): 30-35.
Guyer et al., Lumbar discography. Spine J. May 1, 2003;3(3): 11-27.
Hao et al., Spine disc MR image analysis using improved independent component analysis based active appearance model and Markov random field. J Biomed Engineering+heng Wu Yi Xue Gong Cheng Xue Za Zhi. Feb. 2010;27(1): 6-9.
Hassler O., The Human Intervertebral Disc: A Micro-Angiographical Study on Its Vascular Supply at Various Ages. Acta Orthop Scandinav. Jan. 1, 1969;40(6): 765-772.
Henning et al., Spinal cord MRS in and beyond the cerival spine. Proc Inter'l Soc Magn Reson Med. May 6, 2006; p. 889.
Hesselink J.R., Fundamentals of MR Spectroscopy. University of San Diego Spinwarp NeuroWeb. Retrieved from http://spinwarp.ucsd.edu/NeuroWeb/Text/mrs-TXT.htm; Web.archive.org Sep. 2, 2006; 4 pages.
Holm et al., Reactive changes in the adolescent porcine spine with disc degeneration due to endplate injury. Vet Comp Ortho Traumatol. 2007. 20(1):12-7.
Horsfield et al., Rapid semi-automatic segmentation of the spinal cord from magnetic resonance images: application in multiple sclerosis. Neuroimage. Apr. 1, 2010; 50(2): 446-555.

(56) References Cited

OTHER PUBLICATIONS

Huang et al., Learning-based vertebra detection and iterative normalized-cut segmentation for spinal MRI. IEEE Trans Med Imaging. May 26, 2009;28(10): 1595-1605.

Immke et al., Lactate enhances the acid-sensing Na+ channel on ischemia-sensing neurons. Nat Neurosci. Sep. 1, 2001; 4(9): 869-870.

Inagawa et al., Oral administration of lipopolysaccharides for the prevention of various diseases: benefit and usefulness. Antican Res. Jul. 1, 2011;31(7):2431-2436.

Ishihara et al., Effects of low oxygen concentrations and metabolic inhibitors on proteoglycan and protein synthesis rates in the intervertebral disc. J Orthop Res Nov. 1999; 17(6): 829-835.

Jain et al., Modulation of Rho GTPase activity alleviates chondroitin sulfate proteoglycan-dependent inhibition of neurite extension. J Neurosci Res Jul. 15, 2004;77(2): 299-307.

Järvinen et al., Association between changes in lumbar Modic changes and low back symptoms over a two-year period. BMC Musculoskel Disord. Dec. 2015; 16(1): 1-8.

Jensen et al., Type 1 Modic changes was a significant risk factor for 1-year outcome in sick-listed low back pain patients: a nested cohort study using magnetic resonance imaging of the lumbar spine. Spine J. Nov. 1, 2014;14(11): 2568-2581.

Jensen et al., Vertebral endplate signal changes (Modic change): a systematic literature review of prevalence and association with non-specific low back pain. Eur Spine J. Sep. 12, 2008;17(11): 1407-1422.

Jiru F., Introduction to Post-Processing Techniques. Eur J Radial. Aug. 1, 2008;67(2): 202-217.

Jones et al., Axonal regeneration through regions of chondroitin sulfate proteoglycan deposition after spinal cord injury: a balance of permissiveness and inhibition. J Neurosci. Oct. 15, 2003;23(28): 9276-9288.

Kadoury et al., Personalized X-ray 3-D reconstruction of the scoliotic spine from hybrid statistical and image-based models. IEEE Trans Med Imaging. Sep. 2009;28(9): 1422-1435.

Kapsalaki et al., The Role of Proton Magnetic Resonance Spectroscopy in the Diagnosis and Categorization of Cerebral Abscesses. Neurosurgical Focus. Jun. 1, 2008;24(6): E7; 6 pages.

Kerttula et al., Modic type I change may predict rapid progressive, deforming disc degeneration: a prospective 1-year follow-up study. Eur Spine J. Jun. 2012;21(6): 1135-1142.

Keshari et al., Lactic acid and proteoglycans as metabolic markers for discogenic back pain. Spine. Feb. 1, 2008;33 (3): 312-317.

Keshari et al., Potential metabolic markers for intervertebral disc pain. Proc Intl Soc Mag Reson Med. May 9, 2006;14: 1710. May 9, 2006.

Klapka et al., Collagen matrix in spinal cord injury. J Neurotrauma. Apr. 1, 2006;23(3-4): 422-436.

Klawitter et al., Expression and regulation of toll-like receptors (TLRs) in human intervertebral disc cells. Eur Spine J. Sep. 23, 2014;23(9): 1878-1891.

Koh et al., Automatic segmentation of the spinal cord and the dural sac in lumbar MR images using gradient vector flow field. Conf Proc IEEE Eng Med Biol Soc. Aug. 31, 2010; pp. 317-3120.

Laasonen et al., Bone disease in adolescents with acne fulminans and severe cystic acne: radiologic and scintigraphic findings. Amer J Roentgenol. May 1994; 162(5): 1161-1165.

Le Maitre ete al., Catabolic cytokine expression in degenerate and herniated human intervertebral discs: 1L-1β and TNFα expression profile. Arthr Res. Ther. Aug. 2007; 9(4): R77 in 11 pages.

Li et al., Association between Lumbar Disc degeneration and Propionibacterium Acnes Infection: Clinical Research and Preliminary Exploration of Animal Experiment. Spine. Jul. 1, 2016;41(13):E764-E769.

Lin et al., 2D CSI proton MR spectroscopy of human spinal vertebra: feasibility studies. J Magn Reson Imaging. Mar. 2000; 11(3): 287-293.

Liu et al., Intervertebral Disk Degeneration Related to Reduced Vertebral Marrow Perfusion at Dynamic Contrast-Enhanced MRI. Amer J Radiol. Apr. 2009; 192(4): 974-979.

Liu et al., Oriented active shape models. IEEE Trans Med Imaging. Apr. 2009; 28(4): 571-584.

Liu et al., Rigid model-based 3D segmentation of the bones of joints in MR and CT images for motion analysis. Med Phys. Aug. 2008;35(8): 3637-3649.

Lorenz et al., 3D Statistical Shape Models for Medical Image Segmentation. pp. 414-423, 2nd Inter'l Conf 3-D Imaging Modeling (3DIM '99), IEEE Oct. 8, 1999; pp. 414-423.

Mackiewicz et al., Receptor activator of nuclear factor kappa B ligand in an experimental intervertebral disc degeneration. Clin Exp Rheumatol. Mar. 1, 2009;27(2): 299-306.

Magnitsky et al., Quantification of Propionic Acid in the Bovine Spinal Disk After Infection of the Tissue With Propionibacteria acnes Bacteria. Spine J. Jun. 6, 2018;43(11): E634-E638.

Majumdar S., Magnetic resonance imaging and spectroscopy of the intervertebral disc. NMR In BioMed Nov. 2006; 19(7): 894-903.

McDowell et al., A new phylogenetic group of Propionibacterium acnes. J Med Microbial. Feb. 2008;57(2): 218-224.

McDowell et al., An expanded multilocus sequence typing scheme for propionibacterium acnes: investigation of "pathogenic", "commensal" and antibiotic resistant strains. PLoS One. Jul. 2012;7(7): e41480 in 14 pages.

McDowell et al., Propionibacterium acnes types I and II represent phylogenetically distinct groups. J Clin Microbiol. 2005 25;43(1): 326-334.

Michopoulou et al., Atlas-based segmentation of degenerated lumbar intervertebral discs from MR images of the spine. IEEE Trans Biomed Eng. Apr. 14, 2009;56(9): 2225-2231.

Michopoulou et al., Texture-based quantification of lumbar intervertebral disc degeneration from conventional T2—weighted MRI. Acta Radiologica Feb. 2011;52(1): 91-98.

Wolfer et al., Systematic review of lumbar provocation discography in asymptomatic subjects with a meta-analysis of false-positive rates. Pain Physician 2008; 11(4): 513-538.

Wu et al., Quantitative comparison of AIR, SPM, and the fully deformable model for atlas-based segmentation of functional and structural MR images. Hum Brain Mapp. Sep. 2006; 27(9):747-754.

Ziegler et al., LPS-stimulated human bone marrow stroma cells support myeloid cell development and progenitor cell maintenance. Ann Hematol. Jan. 2016;95(2): 173-8; [Published online Nov. 11, 2015].

Zuo et al., MR Spectroscopy in intervertebral disc and correlation with biochemical analysis. Proc Inter'l Soc Magn Reson Med. Apr. 18, 2009 (p. 2002).

Zuo et al., Assessment of Intervertebral Disc Degeneration With Magnetic Resonance Single-Voxel Spectroscopy. Magn Reson Med. Nov. 2009;62(5): 1140-1146; (Sep. 24, 2009).

Zuo et al., Chondroitin sulfate proteoglycan with neurite-inhibiting activity is up-regulated following peripheral nerve injury. J Neurobiol. 1998;34(1): 41-54.

Zuo et al., Degradation of chondroitin sulfate proteoglycan enhances the neurite-promoting potential of spinal cord tissue. Exp Neurol. Dec. 1, 1998; 154(2): 654-662.

Zuo et al., Quantification of relaxation times of metabolite resonance in intervertebral disc using MR Spectroscopy. Proc Inter'l Soc Magn Reson Med. Apr. 18, 2009 (p. 2001).

Lotz, Jeffrey C., "Solving Low Back Pain: If We Can't Measure It, We Can't Improve It," presented on Nov. 10, 2015 at the International Philadelphia Spine Research Symposium.

Mirantes et al., Pro-inflammatory cytokines: Emerging players regulating HSC function in normal and diseased hematopoiesis. Exp Cell Res. Dec. 10, 2014;329(2): 248-254.

Modic et al., "Degenerative disk disease: assessment of changes in vertebral body marrow with MR imaging. Radiol". Jan. 1988; 166(1): 193-199.

Modic et al., Lumbar Herniated Disk Disease and Canal Stenosis: Prospective Evaluation by Surface Coil MR, CT, and Myelography. Am J Neuroradiol. Jul. 1, 1986;7(4): 709-717.

(56) References Cited

OTHER PUBLICATIONS

Molliver et al., ASIC3, an acid-sensing ion channel, is expressed in metaboreceptive sensory neurons. Mol Pain Nov. 23, 2005; 1: 1744-8069 in 13 pages.

MÜHL et al., Activity and DNA contamination of commercial polymerase chain reaction reagents for the universal 16S rDNA real-time polymerase chain reaction detection of bacterial pathogens in blood. Diagn Microbial Infect Dis. Jan. 1, 2010;66(1): 41-49.

Munshi et al., Nuclear Magnetic Resonance Based Profiling of Biofluids Reveals Metabolic Dysregulation in HIV Infected Persons and Those on Anti-Retroviral Therapy., PLoS One. May 16, 2013;8(5): e64298 in 9 pages.

Myheart, The Difference Between Lactic Acid and Lactate. Overview. Retrieved from https://myheart.nett/lactic-acid-2/the-diffference-between-lactic-acid-and-lactate/; Web.archive.org—Sep. 23, 2015; 6 pages.

Nachemson A., Intradiscal measurements of pH in patients with lumbar rhizopathies. Acta Orthop Scand. Jan. 1, 1969;40(1): 23-42.

Nadkarni et al., Determination of bacterial load by real-time PCR using a broad-range (universal) probe and primers set. Microbiology. Jan. 2002; 148(1): 257-266.

Naves et al., An acid-sensing ion channel that detects ischemic pain. Braz J Med Biol Res. 2005;38(11): 1561-1569.

Neubert A., Automated 3D Segmentation of Vertebral Bodies and Intervertebral Discs from MRI. In 2011 Inter'l Conf Digital Image Computing IEEE Techniques and Applications. Dec. 6, 2011; pp. 19-24.

Neubert et al., Automated detection, 3D segmentation and analysis of high resolution spine MR images using statistical shape models. Phys Med Biol. Dec. 21, 2012; 57(24): 8357-8376.

Niinimaki et al., Association of lumbar artery narrowing, degenerative changes in disc and endplate and apparent diffusion in disc on postcontrast enhancement of lumbar intervertebral disc. Magn Reson Mater Phy. 22:101-109 (2009).

O'Neill et al., Subgroups of positive discs on discography. Spine. Oct. 1, 2004;29(19): 2134-2139.

Oegema et al., Fibronectin and its fragments increase with degeneration in the human intervertebral disc. Spine. Nov. 1, 2000;25(21): 2742-2747.

Patel et al., Diffusion-weighted MRI "claw sign" improves differentiation of infectious from degenerative modic type 1 signal changes of the spine. Am J Neuroradiol. Aug. 1, 2014;35(8): 1647-1652.

Pauly et al., Parameter relations for the Shinnar-Le Roux selective excitation pulse design algorithm [NMR imaging]. IEEE Trans Med Imaging Mar. 1991; 10(1): 53-65.

Peng Z., Automated Vertebra Detection and Segmentation from the Whole Spine MR Images. Proc 2005 IEEE Engineering Med Biol. 27th Annual Conference, Shanghai, China, Sep. 1-4, 2005 Jan. 17;pp. 2527-2530.

Perilli et al., Modic (endplate) changes in the lumbar spine: bone micro-architecture and remodelling. Eur Spine J. Sep. 2015;24(9): 1926-1934.

Piccinini et al., DAMPening inflammation by modulating TLR signalling. Mediators Inflamm. Oct. 2010; Article ID672395 in 21 pages.

Properzi et al., Chondroitin sulphate proteoglycans in the central nervous system: changes and synthesis after injury. Biochem Soc Trans. Apr. 1, 2003;31(2): 335-336.

Quero et al., Hyaluronic acid fragments enhance the inflammatory and catabolic response in human intervertebral disc cells through modulation of toll-like receptor 2 signaling pathways. Arth Res Ther. Aug. 22, 2013;15(4): R94 in 13 pages.

Rajasekaran et al., ISSLS Prize Winner: A Study of Diffusion in Human Lumbar Discs: A Serial Magnetic Resonance Imaging Study Documenting the Influence of the Endplate on Diffusion in Normal and Degenerate Discs. Spine. Dec. 1, 2004;29(23): 2654-2667.

Roberts et al., Histology and pathology of the human intervertebral disc. J Bone Joint Surg Am. Apr. 1, 2006;88 (Suppl 2): 10-14.

Rollason et al., Genotypic and Antimicrobial Characterisation of Propionibacterium Acnes Isolates from Surgically Excised Lumbar Disc Herniations. BioMed Res Int. Jan. 1, 2013; Article ID530382 in 7 pages.

Roughley et al., The role of proteoglycans in aging, degeneration and repair of the intervertebral disc. Biochem Soc Trans. Nov. 1, 2002;30(6): 869-874.

Rukwied et al., Potentiation of nociceptive responses to low pH injections in humans by prostaglandin E2. J Pain. May 1, 2007;8(5): 443-451.

Savvopoulou et al., Degenerative Endplate Changes of the Lumbosacral Spine: Dynamic Contrast-Enhanced MRI Profiles Related to Age, Sex, and Spinal Level. J Magn Reson Imaging Feb. 2011;33(2): 382-389.

Schistad et al., The association between Modic changes and pain during 1-year follow-up in patients with lumbar radicular pain. Skeletal Radiol. Sep. 2014;43(9): 1271-1279.

Scuderi et al., A critical evaluation of discography in patients with lumbar intervertebral disc disease. Spine J Jul. 1, 2008;8(4): 624-629.

Sharif H.S., Role of MR imaging in the management of spinal infections. AJR Am J Roentgenol. Jun. 1992; 158: 1333-1345.

Star-Lack et al., Improved water and lipid suppression for 3D PRESS CSI using RF bank selective inversion with gradient dephasing (BASING). Magn Reson Med. Aug. 1997;38(2): 311-321.

Tern et al., Parametric modelling and segmentation of vertebral bodies in 3D CT and MR spine images. Phys Med Biol. Nov. 11, 2011; 56(23): 7505-7522.

Stirling et al., Association between sciatica and Propionibacterium acnes. Lancet. Jun. 23, 2001;357(9273): 2024-2025.

Strickland et al., Development of subject-specific geometric spine model through use of automated active contour segmentation and kinematic constraint-limited registration. J Digit Imaging. Oct. 2011; 24(5): 926-942.

Sutherland et al., Acid-sensing ion channel 3 matches the acid-gated current in cardiac ischemia-sensing neurons. Proc Natl Acad Sci U S A. Jan. 16, 2001;98(2): 711-716.

Thompson et al., Modic changes on MR images as studied with provocative diskography: clinical relevance—a retrospective study of 2457 disks. Radiol. Mar. 2009;250(3): 849-855.

Torkki et al., Osteoclast activators are elevated in intervertebral disks with Modic changes among patients operated for herniated nucleus pulposus. Eur Spine J. Jan. 2016;25: 207-216; [Epub Mar. 27, 2015].

Ulrich et al., ISSLS prize winner: repeated disc injury causes persistent inflammation. Spine. Dec. 1, 2007;32(25): 2812-2819.

Urban W., Pathophysiology of the Intervertebral Disc and the Challenges for MRI. J Magn Reson Imaging. Feb. 25, 2007(2):419-32. Feb. 2007;25(2): 4419-432.

Urquhart et al., Could low grade bacterial infection contribute to low back pain? A systematic review. BMC Med. Dec. 2015; 13(1): 1-3 in 13 pages ..

Valanne et al., CAMP factor homologues in Propionibacterium acnes: A new protein family differentially expressed by types I and II. Microbiology. May 2005; 151(5): 1369-1379.

Vos et al., Years lived with disability (YLDs) for 1160 sequelae of 289 diseases and injuries 1990-2010: a systematic analysis for the Global Burden of Disease Study 2010. Lancet. Dec. 15, 2012;380(9859): 2163-2196.

Vowels et al., Induction of proinflammatory cytokines by a soluble factor of Propionibacterium acnes: implications for chronic inflammatory acne. Infect Immun. Aug. 1995;63(8): 3158-3165.

Vrtovec et al., Automated curved planar reformation of 3D spine images. Phys Med Biol. Sep. 14, 2005;50(19): 4527-4540.

Wan et al., PPAR-γ regulates osteoclastogenesis in mice. Nat Med. Dec. 2007; 13(12): 1496-1503.

Wang et al., Tumor necrosis factor α- and interleukin-1B-dependent induction of CCL3 expression by nucleus pulposus cells promotes macrophage migration through CCR1. Arthritis Rheum. Mar. 2013;65(3): 832-842.

Wedderkopp et al., No evidence for presence of bacteria in modic type I changes. Acta Radiol. Jul. 9, 2009;50(1): 65-70.

(56) References Cited

OTHER PUBLICATIONS

Weiner et al., Endplate changes following discectomy: Natural history and associations between imaging and clinical data. Eur Spine J. 2015;24(11):2449-2457; [Published online Dec. 28, 2014].
Wichman H.J., Discography: Over 50 years of controversy. Off Pub State Med Soc Wisconsin. Feb. 1, 2007;106(1): 27-29.
"Spectroscopy reconstruction" and "Spectroscopy processing" In: "Intera Spectroscopy—Instructions for Use", Jul. 2002 (2002-07), Philips Medical Systems, Netherlands, pp. 6-1 to 7-6.
Albert et al., Antibiotic treatment in patients with chronic low back pain and vertebral bone edema (Modic type 1 changes): a double-blind randomized clinical controlled trial of efficacy. Eur Spine J. Feb. 13, 2013;22(4):697-707.
Albert et al., Does nuclear tissue infected with bacteria following disc herniations lead to Modic changes in the adjacent vertebrae? Eur Spine J. Apr. 2013;22(4):690-696.
Arndt et al., Oct. 2012. Bacteriology of degenerated lumbar intervertebral disks. J. Spinal Disord. Tech. 25(7): E211-6.
Bandettini et al., MultiContrast Delayed Enhancement (MCODE) improves detection of subendocardial myocardial infarction by late gadolinium enhancement cardiovascular magnetic resonance: a clinical validation study. J Cardiovasc Magn Reson., vol. 14, No. I, Nov. 30, 2012 (Nov. 30, 2012).
Bartels et al., Oxygen and lactate concentrations measured in vivo in the intervertebral discs of patients with scoliosis and back pain. Spine Jan. 1998;23 (1): 1-7.
Bechara et al., Application of a semiautomated contour segmentation tool to identify the intervertebral nucleus pulposus in MR images. AJNR Am J Neuroradiol. Oct. 2010; 31(9):1640-4.
Ben Ayed et al., Graph cuts with invariant object-interaction priors: application to intervertebral disc segmentation. Inf Process Med Imaging. 2011;22:221-32.
Bendix et al., Sep. 15, 2012. Lumbar modic changes-a comparison between findings at low- and high-field magnetic resonance imaging. Spine (Phila. PA. 1976). 37, 1756-1762.
Bertok L., New Prospect for the Enhancement of Natural Immunity. In Natural Immunity, First Ed. Elsevier Science; Apr. 2005; pp. 289-307.
Bhanji et al., Jul-Aug. 2002. Transient bacteremia induced by toothbrushing a companson of the Sonicare toothbrush with a conventional toothbrush. Pediatr. Dent. 24(4): 295-259.
Blumenkrantz et al., A feasibility study of in vivo T1rho imaging of the intervertebral disc. Magn Reson Imaging. Oct. 2006;(24)8: 1001-1007.
Boden et al., Abnormal magnetic-resonance scans of the lumbar spine in asymptomatic subjects. A prospective investigation. J Bone & Joint Surg. 1990;72: 403-408.
Bolan et al., Measurement and Correction of Repiration-Induced Bo Variations in Breast 1H MRS at 4 Tesla. Magn Reson Med. 2004;52:1239-1245.
Boos et al., Natural History of Individuals With Asymptomatic Disc Abnormalities in Magnetic Resonance Imaging; Predictors of Low Back Pain-Related Medical Consultation and Work Incapacity. Spine. 2000;25(12): 1484-1492.
Borenstein et al., The Value of Magnetic Resonance Imaging of the Lumbar Spine to Predict Low-Back Pain in Asymptomatic Subjects: A Seven-Year Follow-up Study. J Bone & Joint Surg. 2001;83: 1306-1311.
Bottomley P.A., Spatial localization in NMR spectroscopy in vivo. Ann N Y Acad Sci 1987; 508:333-348.
Brown et al., (1997). Sensory and sympathetic innervation of the vertebral endplate in patients with degenerative disc disease. J Bone Joint Surg Br 79(1): 147-153.
Brown et al., NMR chemical shift imaging in three dimensions. Proc. Natl. Acad. Sci. USA 1982; 79:3523-3526.
Buenaventura et al., Systematic review of discography as a diagnostic test for spinal pain: an update. Pain Physician 2007;10(1): 147-164.
Burke et al., Human nucleus pulposis can respond to a pro-inflammatory stimulus. Spine. Dec. 15, 2003;28 (24):2685-2693.

Burke et al., MR endplate changes are associated with increased disc inflammatory mediator production. In Ortho Proceedings. J Bone Jt. Surg Br. Feb. 1, 2003;85-B(Supp II): 164.
Carragee et al., 2009 ISSLS Prize Winner: Does Discography Cause Accelerated Progression of Degeneration Changes in the Lumbar Disc? A Ten-year Matched Cohort Study. Spine. Oct. 1, 2009;34(21): 2338-2345.
Carragee et al., A gold standard evaluation of the "discogenic pain" diagnosis and determined by provocative discography. Spine Aug. 15, 2006;31(18): 2115-2123.
Carragee et al., Discographic, MRI and psychosocial determinants of low back pain disability and remission: A prospective study in subjects with benign persistent back pain. Spine J. Jan. 1, 2005;5(1): 24-35.
Carragee et al., Discography, a review. Spine J Sep. 1, 2001;1(5): 364-372.
Carragee et al., Low-pressure positive Discography in subjects asymptomatic of significant low back pain illness. Spine 2006;31(5): 505-509.
Carragee et al., Prospective Controlled Study of the Development of Lower Back Pain in Previously Asymptomatic Subjects Undergoing Experimental Discography. Spine. May 15, 2004;29(10): 1112-1117.
Carrino et al., Prospective evaluation of contrast-enhanced MR imaging after uncomplicated lumbar discography. Skeletal Radiol. (2007) 36:293-299.
Chen et al., Modic Changes and Disc Degeneration Caused by Inoculation of Propionibacterium acnes inside Intervertebral Discs of Rabbits: A Pilot Study. Biomed Res Int 2016:Article ID9612437 in 7 pages.
Cherkin et al., Physician Variation in Diagnostic Testing for Low Back Pain. Arthritis & Rheumatism, Jan. 1994; 37(1): 15-22.
Chevrefils et al., Texture analysis for automatic segmentation of intervertebral disks of scoliotic spines from MR images. IEEE Trans Inf Technol Biomed. Jul. 2009; 13(4): 608-620.
Cohen et al., Lumbar discography: a comprehensive review of outcome studies, diagnostic accuracy, and principles. Reg Anesth Pain Med. Mar. 1, 2005;30(2): 163-183.
Comments Regarding U.S. Appl. No. 12/579,371 (Filed Oct. 14, 2009) and PCT Patent Application No. PCT/US2010/052737 (Filed Oct. 14, 2010).
Coppes et al., Innervation of "painful" lumbar discs. Spine. Oct. 1, 19975;22(20): 2342-2349.
Cunningham et al., Design of symmetric-sweep spectral-spatial RF pulses for spectral editing. Magn Reson Med Jul. 2004;52(1): 147-153.
Dalca et al., Segmentation of nerve bundles and ganglia in spine MRI using particle filters. Med Image Comput Comput Assist Interv. 2011; 14(Pt 3): 537-545.
Derby et al., Analgesic Discography: Can Analgesic Testing Identify a Painful Disc? SpineLine Nov. 2008-Dec; 17-24.
Derincek et al., Discography: Can pain in a morphologically normal disc be due to an adjacent abnormal disc? Arch Orthop Trauma Surg. Oct. 2007; 127: 699-703.
Di Martino et al., Autoimmunity in intervertebral disc herniation: from bench to bedside. Expert Opin. Ther. Targets. Aug. 30, 2013; 17(12): 1461-1470.
Diamant et al., Correlation between lactate levels and pH in discs of patients with lumbar rhizopathies. Experientia Dec. 1968;24(12): 1195-1196.
Dubey et al., Proton MR Spectroscopic Imaging of the Human Cervical Spine at 3 Tesla. Proc Int'l Soc Magn Reson Med. 13th Meeting; May 7, 2005; p. 812.
Dudli et al., Fracture of the vertebral endplates, but not equienergetic impact load, promotes disc degeneration in vitro. J Ortho Res. May 2012;30(5): 809- 816; Published online Oct. 24, 2011.
Dudli et al., Molecular and Cellular Changes in Vertebral Bone Marrow Lesions. In Annual Meeting American Academy of Orthopaedic Surgeons. Orlando; Mar. 2, 2016; Paper 454.
Dudli et al., Pathobiology of Modic changes. Eur Spine J. Nov. 2016;25(11): 3723-3734.

(56) References Cited

OTHER PUBLICATIONS

Dudli et al., Propionibacterium acnes infected intervertebral discs cause vertebral bone marrow lesions consistent with Modic changes. J Ortho Res. Aug. 2016. 34(8): 1447-1455.

Egger et al., Square-cut: a segmentation algorithm on the basis of a rectangle shape. PLoS One. Feb. 2012:7(2): e31064 in 13 pages.

Ellman et al., Toll-like receptor adaptor signaling molecule MyD88 on intervertebral disk homeostasis: In vitro, ex vivo studies. Gene. Jun. 10, 2012;505(2): 283-290.

Ferguson et al., Fluid flow and convective transport of solutes within the intervertebral disc. J Biomech. Feb. 1, 2004;37(2): 213-221.

Frahm et al., Localized high-resolution proton NMR spectroscopy using stimulated echoes: Initial applications to human brain in vivo. Magn Reson Med Jan. 1989; 9(1): 79-93.

\* cited by examiner

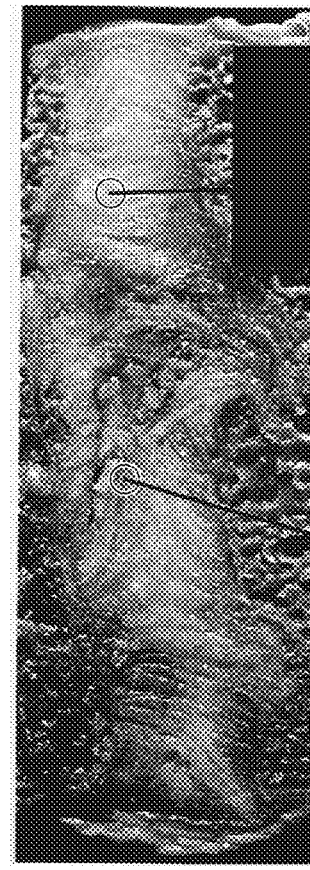
FIG. 3X
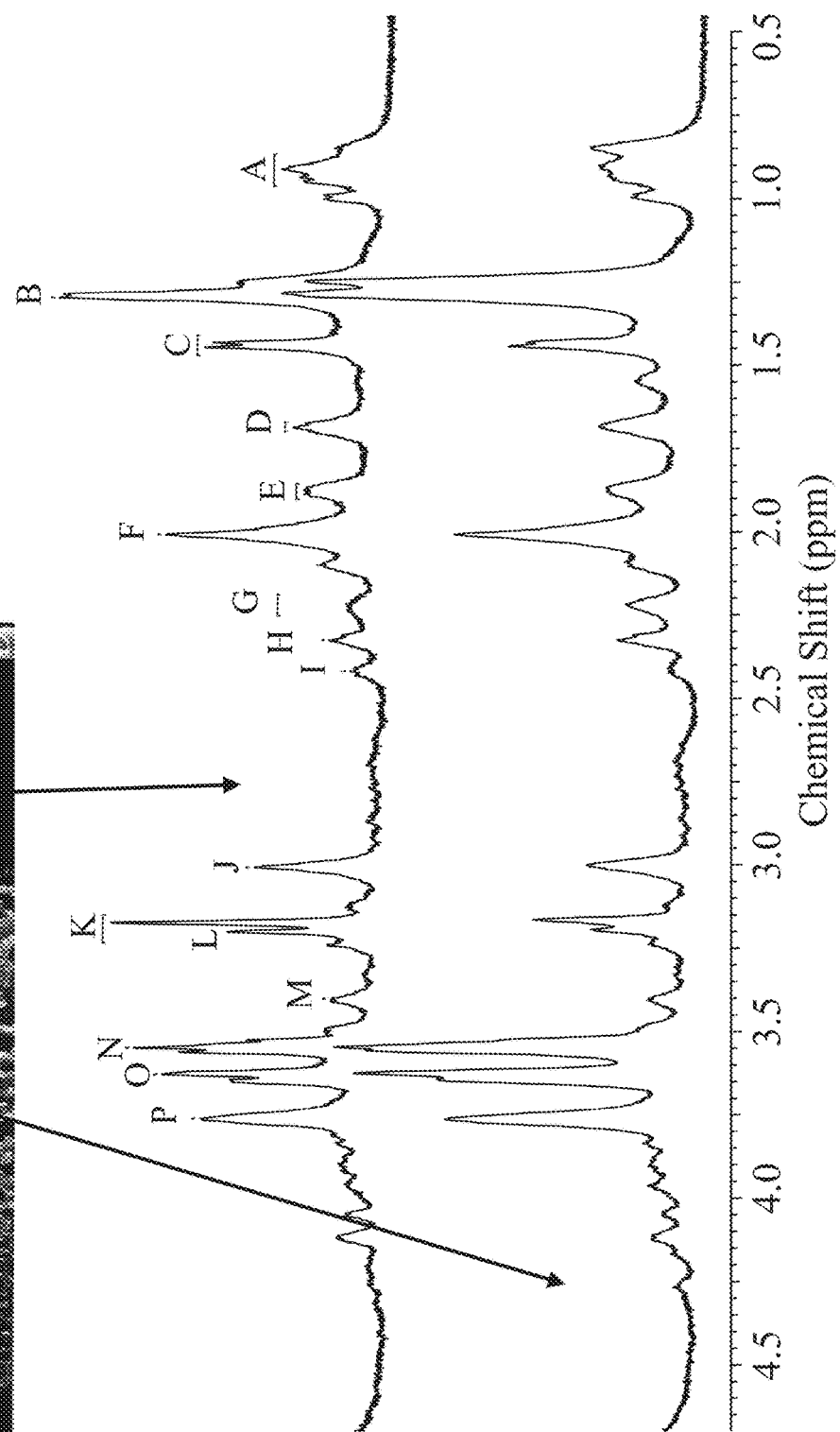
FIG. 3Y
FIG. 3Z

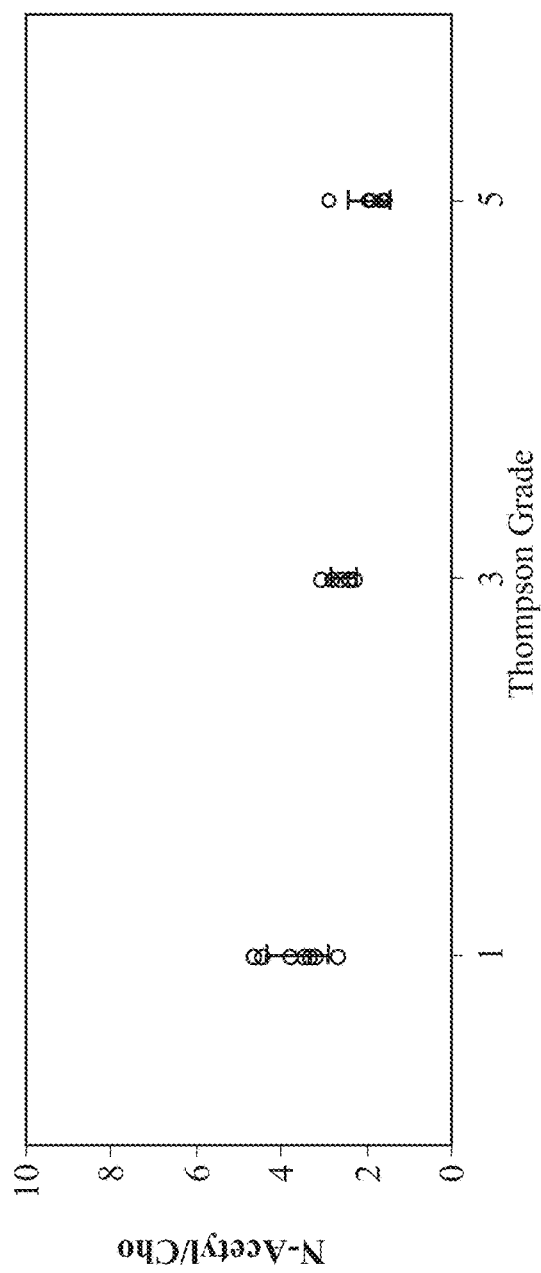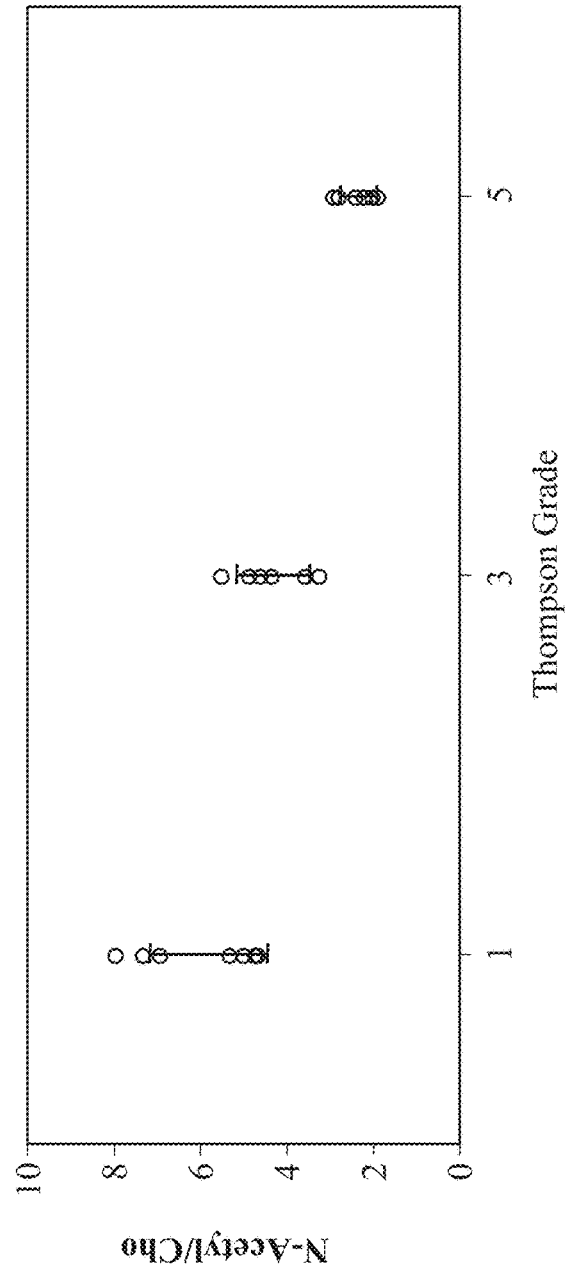
FIG. 4A
FIG. 4B

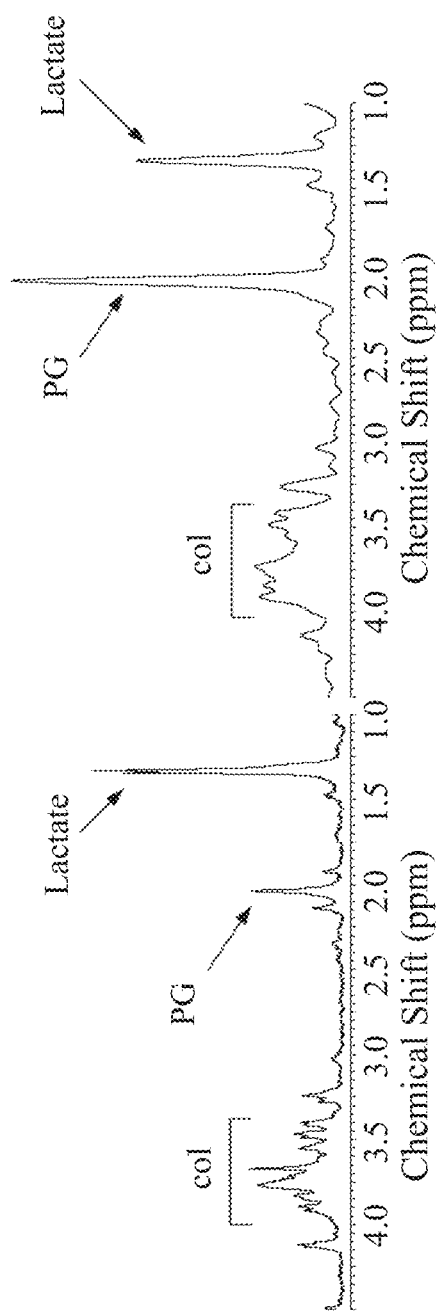

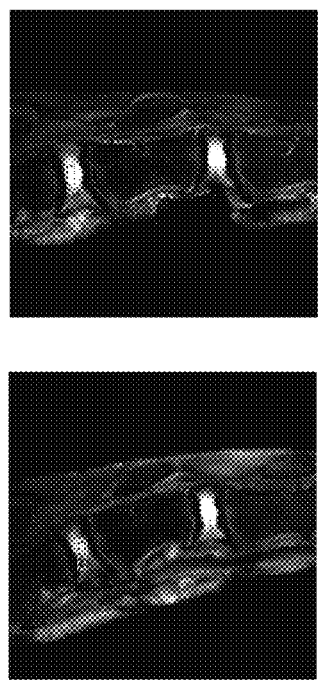
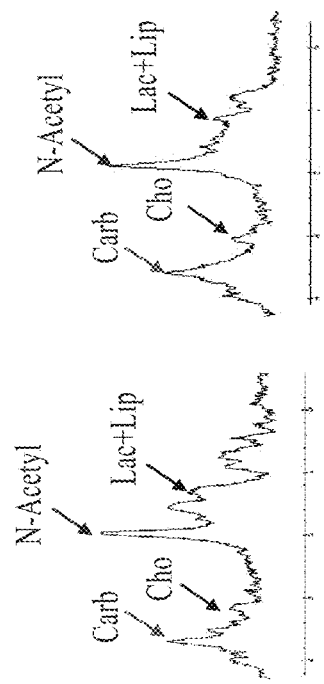

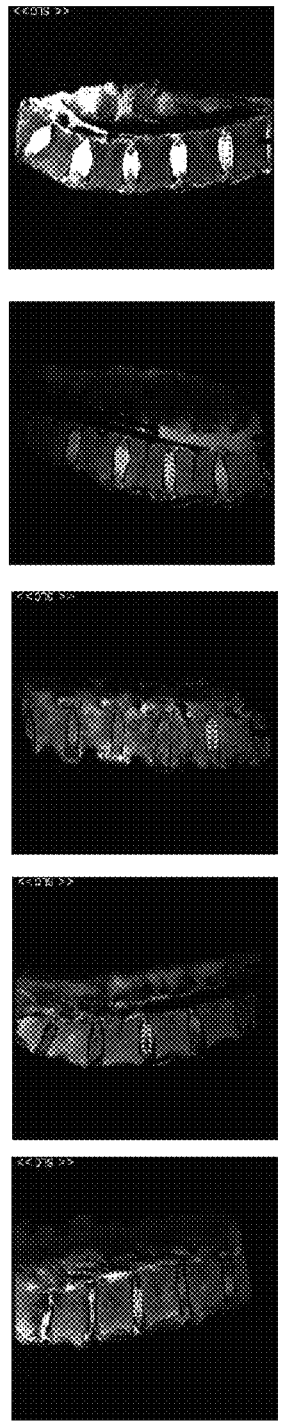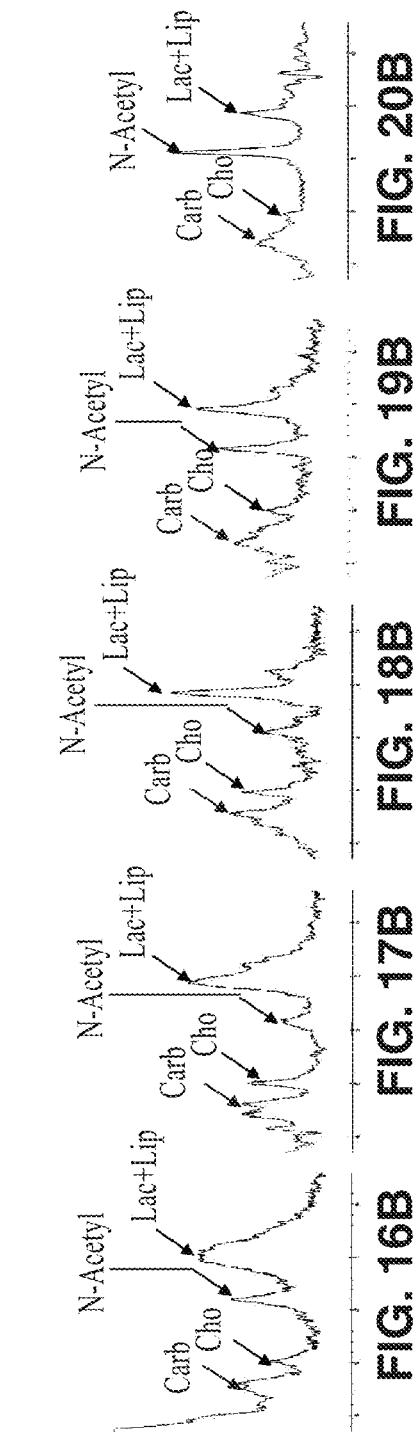

SYSTEMS AND METHODS USING NUCLEAR MAGNETIC RESONANCE (NMR) SPECTROSCOPY TO EVALUATE PAIN AND DEGENERATIVE PROPERTIES OF TISSUE

CROSS-REFERENCE TO RELATED APPLICATIONS

This application is a continuation of U.S. patent application Ser. No. 15/866,312 filed on Jan. 9, 2018, incorporated herein by reference in its entirety, which is a continuation of U.S. patent application Ser. No. 13/680,612 filed on Nov. 19, 2012, now U.S. Pat. No. 9,901,285, incorporated herein by reference in its entirety, which is a continuation of U.S. patent application Ser. No. 11/829,847 filed on Jul. 27, 2007, now U.S. Pat. No. 8,344,728, incorporated herein by reference in its entirety, which is a 35 U.S.C. § 111(a) continuation-in-part of PCT international application serial number PCT/US2006/003036 filed on Jan. 30, 2006, incorporated herein by reference in its entirety, which claims priority to, and the benefit of, U.S. provisional patent application Ser. No. 60/737,110, filed on Nov. 15, 2005, incorporated herein by reference in its entirety, and which claims priority to, and the benefit of, U.S. provisional patent application Ser. No. 60/648,241, filed on Jan. 28, 2005, incorporated herein by reference in its entirety. Priority is claimed to each of the foregoing applications.

This application is also related to PCT International Publication No. WO 2006/081471 published on Aug. 3, 2006 and republished on Aug. 23, 2007, incorporated herein by reference in its entirety. This application is also related to U.S. Patent Application Publication No. US-2008-0039710-A1 published on Feb. 14, 2008, incorporated herein by referenced in its entirety.

STATEMENT REGARDING FEDERALLY SPONSORED RESEARCH OR DEVELOPMENT

This invention was made with Government support under Grant Nos. R01-AG017762 and R21-AR051048 awarded by National Institutes of Health. The Government has certain rights in the invention.

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND OF THE INVENTION

1. Field of the Invention

This invention pertains generally to imaging of tissues associated with skeletal joints, and more particularly to identifying and/or characterizing medical conditions associated with skeletal joints, pain, or both. Still more specifically, it relates to using nuclear magnetic resonance (NMR) spectroscopy to identify, localize, and/or characterize chemical, molecular, structural, or other signatures related to medical conditions in tissues, such as degradation or pain associated with skeletal joints (for example spine).

2. Description of Related Art

Intervertebral disc degeneration (IVDD) is a leading cause of lumbar spine related lower back pain, a common medical problem that affects 60 to 80% of aging Americans. The intervertebral disc is a flexible fibrocartilaginous structure that supports forces and facilitates spinal movement. Healthy discs consist of three specific tissue components: 1) the annulus fibrosus, a collagenous region tightly packed circumferentially around the periphery of the disc which allows for pliability; 2) the nucleus pulposus, a hydrated, proteoglycan gel located at the center of the disc, which when compressed expands radially and braces the annulus fibrosus to maintain stiffness and prevents the annulus from buckling under compression; and 3) a cartilaginous endplate that separates the nucleus from the adjacent vertebral bone.

Disc degeneration is characterized by a complex series of physical and chemical degradative processes. The extent or severity of IVDD is most commonly described clinically using the Thompson Grading Scale, where following a set of parameters, a x-ray radiographic inspection of the disc is conducted and the gross morphology is used to determine the extent of degeneration. One research group has concluded that changes to the mechanical properties of the intervertebral disc suggest a shift from a "fluid like" behavior to a more "solid like" behavior with degeneration. Fixed charge density (FCD) and the biochemical environment of the surrounding water have also been shown to greatly influence degeneration; as highly charged proteoglycans attract water and cause the tissue to swell, disc pressurization and spinal load support are directly affected. Differences in the Thompson Grade are reflected by changes in the concentrations of constituents such as collagen and proteoglycans in both the annulus and nucleus. It has been proposed that biochemical degradation, upregulation of genes associated with collagen matrix degradation, and the cumulative effect of mechanical loading, all stimulate the degenerative disc process.

Identification and characterization of disc degeneration thus involves a wide array of technological developments and efforts over many years. Yet, an adequate, repeatable, non-invasive system and method to characterize factors related to pain, pain generation, or disc degeneration has yet to be provided as a useful medical tool.

It is also well appreciated in current medical practice that pain is a remarkably difficult phenomenon to diagnose and localize. This is in particular the case with respect to skeletal joint pain, and in particular back pain. Whereas certain targeted pain relief therapies may be made available, such as directed energy sources to locally ablate painful nociceptive nerves, the identification and localization of where to treat is a critical pacing item that often falls well short of providing the requisite specificity. As a result, the ability to successfully target such therapies in overall pain management is extremely challenging at best.

Degenerative disc disease, while a predominant cause of debilitating back pain, is however only one example of medical conditions in dire need for better tools and methods to characterize and localize the condition in order to appropriately direct therapies. Chronic back pain, for example, may result from several underlying root causes. These causes include, for example, vertebral compression fractures, degenerative disc disease, and disc herniation. In addition, other joint pain, such as of the spine or other skeletal joints (e.g. knuckles, ankles, knees, hips, shoulders, wrists, elbows) may also be the result of many different underlying causes (or combinations of them), and may also be very difficult to localize sufficiently to direct localized therapies. Pain associated with any or all of these joints may be located at the connective or cushioning tissue of the joint itself (e.g. the disc for spinal joints), or within the bone, or at transitional areas (e.g. the end-plates of vertebral bodies bordering discs).

A substantial need exists for improved non-invasive tools and methods for identifying and characterizing the degradation of tissues in the body. This is in particular the case with respect to skeletal joints, in particular intervertebral joints of the spine, and further in particular in and around the intervertebral discs themselves.

A substantial need also exists for improved non-invasive tools and methods for identifying, characterizing, and/or localizing pain within the body. This is also in particular the case with respect to skeletal joints, in particular interverterbral joints of the spine, and further in particular in and around the intervertebral discs themselves.

BRIEF SUMMARY OF THE INVENTION

One aspect of the present disclosure provides a medical diagnostic system with a non-invasive imaging modality that is adapted to provide useful information that is indicative of a degree of a property of a region of tissue based upon a chemical signature of a factor associated with that property.

Spectra obtained using the NMR spectroscopic method are very similar for samples taken from annular and nuclear regions of discs. Visually apparent changes are observed in the spectra of the annular and nuclear samples from discs with increasing Thompson grade. Area ratios of the N-Acetyl to choline regions and the choline to carbohydrate regions of the spectra allow for discrimination between discs of increasing Thompson grade with minimal overlap of individual ratios.

According to one mode of this aspect, the property is associated with pain.

According to another mode of this aspect, the property is associated with tissue degeneration.

According to another mode of this aspect, the system provides useful information that is indicative of a property associated with a skeletal joint.

According to another mode of this aspect, the system provides useful information that is indicative of a property associated with an intervertebral joint.

According to another mode of this aspect, the system provides useful information that is indicative of a property associated with an intervertebral disc.

According to another mode, the system provides useful information indicative of a degree of degradation of an intervertebral disc.

According to another mode, the system provides useful information indicative of a location where pain is being experienced in a patient.

According to another mode, the system provides the useful information based at least in part upon an NMR spectrum of the region of tissue.

Another aspect described hereunder is a medical diagnostic system configured to provide useful information that is indicative of a property of a first region of tissue based upon a magnetic resonance (NMR) spectrum of the first region, and wherein the property is associated with at least one of tissue degeneration and pain.

Another aspect described hereunder is a medical diagnostic system configured to provide useful information that is indicative of a property of a first region of tissue based upon a nuclear magnetic resonance (NMR) spectrum of the first region, and wherein the property is associated with tissue degeneration.

Another aspect described hereunder is a medical diagnostic system configured to provide useful information that is indicative of a property of a first region of tissue based upon a nuclear magnetic resonance (NMR) spectrum of the first region, and wherein the property is associated with pain.

Another aspect described hereunder is a system for identifying or characterizing a property of a first region of tissue associated with a skeletal joint. This aspect includes a processor that is configured to process data related to an NMR spectrum of the tissue in a manner that provides useful information that is indicative of the property in the first region of tissue.

Another aspect described hereunder is a system for identifying or characterizing a property of a first region of tissue associated with a skeletal joint. This particular aspect includes an NMR spectroscopy system that is configured to provide an NMR spectrum of the first region of tissue and to provide data related to the spectrum in a form that is processable to provide useful information that is indicative of the property in the first region of tissue.

Another aspect described hereunder is a system for identifying or characterizing a property of a first region of tissue associated with a skeletal joint. This aspect includes a substantially non-invasive imaging modality that is configured to provide imaging data related to the first region of tissue in a form that is processable to provide useful information that is indicative of the property in the first region of tissue.

Another aspect described hereunder is a system for identifying a property of at least a first region of an intervertebral disc. This aspect includes an NMR spectroscopy system adapted to provide data related to an NMR spectrum of the first region of tissue in a form that is processable to provide useful information that is indicative of the property in the first region of tissue.

Another aspect described hereunder is a system that provides useful information for diagnosing a property of a first region of tissue that is associated with tissue degeneration or pain. This aspect includes a computer readable software program in computer readable media form and that is configured to process data from a nuclear magnetic resonance (NMR) spectrum taken from the first region of tissue. The program is further configured to provide the useful information from the processed data.

Another aspect of the invention is a system for identifying, characterizing, and/or localizing a property of tissue associated with a skeletal joint. Such aspect may further include any one or more of the various aspects, modes, embodiments, variations, or features herein shown or described, or combinations thereof.

According to one mode of this aspect, the system is adapted to provide information indicative of a degree of a property of at least a portion of an intervertebral disc.

Another aspect is a system for identifying or characterizing a property of tissue associated with a skeletal joint in a patient. This includes at least one of: a processor that is configured to process information related to NMR spectroscopy of the tissue in a manner that is adapted to allow a degree of the property to be identified or characterized; an NMR spectroscopy systems that is configured to provide spectroscopic information related to the tissue such that a degree of the property may be identified or characterized; or a substantially non-invasive imaging modality that is configured to provide information regarding the tissue such that a degree of the property may be identified or characterized. Or, the system may include a combination of two or more of the foregoing.

According to one mode of this aspect, the information is related to a degree of a property of at least a portion of an intervertebral disc.

Another aspect of the invention is a system for characterizing at least a portion of an intervertebral disc with respect to a degree of a property of that disc. This system includes an NMR spectroscopy system adapted to capture a spectrum related to the portion. The spectrum provides information that is useful to indicates at least in part the degree of the property.

According to one further embodiment of the foregoing aspects and modes, the respective system is adapted to produce the information based on either or both of an annular portion or a nucleus portion of the intervertebral disc.

According to another embodiment, the system is adapted to display a curve related to the spectrum, and a portion of the curve provides the information.

According to another embodiment, the information is adapted to distinguish a degree of degradation of the disc. According to one highly beneficial further embodiment, the information is adapted to distinguish as to the degree of degradation by reference to a Thompson scale.

According to another embodiment, the property comprises at least one of pain, or at least one factor that correlates with pain.

According to another embodiment, the information is related to ratios of the resonances in the N-acetyl to choline regions, and choline to carbohydrate regions of the spectra.

According to another embodiment, the information is related to chondroitan sulfate, or a metabolite or degradation product thereof.

According to another embodiment, the information relates to at least one of $T_1$ and $T_2$ relaxation times of chemical constituents of disc spectra.

According to another embodiment, the property comprises at least one of a degree of dehydration of the disc, a degree of breakdown of a proteoglycan matrix of the disc, and a degree in a breakdown of a collagen matrix.

According to another embodiment, the system further includes a proton high resolution magic angle spinning spectroscopy system that is adapted to produce the information.

Another aspect of the invention is a method for identifying or characterizing a property of tissue associated with a skeletal joint. One or more of the foregoing method aspects, modes, embodiments, variations, or features herein described, or combinations thereof, may be employed to advance this method.

One further mode of this aspect further includes providing information indicative of a degree of a property of at least a portion of an intervertebral disc.

Another aspect is a method for identifying or characterizing a property of tissue associated with a skeletal joint in a patient, and includes at least one of the following steps: processing information related to NMR spectroscopy of the tissue in a manner that is adapted to allow a degree of the property to be identified or characterized; providing spectroscopy information from an NMR spectroscopy system and that is related to the tissue such that a degree of the property may be identified or characterized; or providing information regarding the tissue from a substantially non-invasive imaging modality with respect to the tissue and such that a degree of the property may be identified or characterized. Or a combination of one or more of the foregoing may be used.

One mode of this aspect includes determining a degree of a property of at least a portion of an intervertebral disc based upon the information.

Another aspect of the invention is a method for characterizing at least a portion of an intervertebral disc with respect to a degree of a property thereof, and includes capturing a spectrum related to the portion using an NMR spectroscopy system. The spectrum provides information that indicates at least in part the degree of the property.

According to one embodiment of the various method aspects and modes just described, the information produced is based on either or both of an annular portion or a nucleus portion of the intervertebral disc.

In another embodiment, a curve is displayed that is related to the spectrum, and wherein a portion of the curve provides the information.

Another embodiment includes distinguishing a degree of degradation of the disc based upon the information. A still further embodiment includes distinguishing the degree of degradation of the disc in relation to a Thompson grade based upon the information.

Another embodiment includes correlating the disc with degree of pain, or at least one factor that correlates with pain, based upon the information.

According to another embodiment, the information is related to a ratio of at least one of the resonances in the N-acetyl to choline regions, and choline to carbohydrate regions, of the spectra.

According to another embodiment, the information is related to chondroitin sulfate, or a metabolite or degradation product thereof.

According to another embodiment, the information relates to at least one of $T_1$ and $T_2$ relaxation times of chemical constituents of disc spectra.

According to another embodiment, the property relates to at least one of a degree of dehydration of the disc, a degree of breakdown of a proteoglycan matrix of the disc, and a degree in a breakdown of a collagen matrix.

Another embodiment includes producing the information at least in part using a proton high resolution magic angle spinning spectroscopy system.

Further to various of the aspects described hereunder, additional modes include beneficial non-invasive analysis of tissue properties based upon at least one of lactate-related, proteoglycan-related, or collagen-related chemical signatures recognized within the tissue. Particular beneficial modes include, for example, comparing ratios of recognized features of these signatures, and in one highly beneficial embodiment are based upon NMR resonances of such factors. Of further benefit as provided in the present embodiments, comparisons of two or more such resonances, such as for example in particular their peaks or other features indicating the extent of their presence, are made to provide distinguishing results that indicate a degree of a particular condition in the subject tissue (such as for example extent of degeneration or pain).

One additional particularly beneficial mode of the aspects provided hereunder includes use of NMR spectroscopy. In one embodiment, such spectroscopy involves equipment operating at above 8 Tesla, and in further embodiment at between about 11 and 12 Tesla. In another embodiment, the equipment operates at between about 4 and 10 Tesla, such as in particular at about 7 Tesla. In another embodiment, it operates at between about 2 and 4 Tesla, such as at about 3 Tesla. In another embodiment, it operates at below 3 Tesla, such as for example at about 1.5 Tesla. In this regard, 3T MRI systems are considered to provide substantial benefit for spectroscopic imaging & diagnosis of tissue regions within human patients, such as skeletal joints and in particular spinal joints and intervertebral discs. For lower Tesla equipment, still further embodiments contemplate using pass filter augmentation, amplification, or gain of signals falling within particular ranges targeted, such as certain particular peak resonant frequencies targeted as recognized signatures correlating with certain factors to be examined for the intended non-invasive diagnosis.

In additional embodiments, local coils may be used in MRI systems for enhanced magnetic resonance data acquisition. For example, local coils similar to those previously disclosed and developed for head and neck imaging may be used around skeletal joints for purposes of acquiring data useful according to the present aspects of this disclosure. In one particular embodiment, a local spine coil is used.

Particular beneficial embodiments of the present aspects include useful analysis of ratios between regions of NMR spectra that represent different chemical constituents in tissue regions being evaluated. It is appreciated that while using such ratios, and in particular certain specific ratios herein described, the individual components of such ratios representing individual spectral regions associated any one of a number of chemical constituents, and in particular those herein described with some specificity, are also considered useful data under the broad aspects and modes and thus represent further embodiments contemplated hereunder.

Another aspect of the present disclosure evaluates N-Acetyl/cho NMR spectral peak ratios tissue, with decreased values providing a measure of tissue degeneration useful in patient diagnosis. In a further mode, extent of localized pain is diagnosed based upon such evaluation. In another further mode the tissue evaluated is intervertebral disc tissue, and according to one embodiment includes at least a portion of a nucleus pulposus.

Another aspect of the present disclosure evaluates N-Acetyl/cho NMR spectral peak ratios in tissue, with increased values providing a measure of degeneration useful in patient diagnosis. In a further mode, extent of localized pain is diagnosed based upon such evaluation. In another further mode the tissue evaluated is intervertebral disc tissue, and according to one embodiment includes at least a portion of a nucleus pulposus.

Another aspect of the present disclosure evaluates choline-related NMR spectral peaks in tissue, with increased values providing a measure of disc degeneration useful in patient diagnosis. In a further mode, extent of localized pain is diagnosed based upon such evaluation. In another further mode the tissue evaluated is intervertebral disc tissue, and according to one embodiment includes at least a portion of a nucleus pulposus.

Another aspect evaluates one or more NMR spectral peak ratios in a target tissue region, compares those values against similar NMR spectral peak ratios in other adjacent or reference tissue, and determines extent and localization of tissue degeneration and/or pain based upon such comparison.

Each aspect, mode, embodiment, variation, or feature herein described is considered independently beneficial without requiring combination with the others. However, such further combinations and sub-combinations thereof are also considered yet further beneficial independent aspects invention.

Further aspects of the invention will be brought out in the following portions of the specification, including without limitation as presented in the claims, and wherein the detailed description is for the purpose of describing exemplary and preferred embodiments of the invention without necessarily placing limitations thereon, though such preferred embodiments may be described as providing particularly valuable benefits and uses.

BRIEF DESCRIPTION OF THE SEVERAL VIEWS OF THE DRAWING(S)

The invention will be more fully understood by reference to the following drawings which are for illustrative purposes only:

FIGS. 1X, 1Y, 1Z show a representative 1-D HR-MAS spectra acquired a Thompson Grade 1 disc (FIG. 1X) from the annulus fibrosus region (spectra at FIG. 1Y) and the nucleus pulposus region (spectra located at FIG. 1Z).

FIGS. 2X, 2Y, 2Z show representative 1-D HR-MAS spectra acquired for a Thompson Grade 3 disc (FIG. 2X) from the annulus fibrosus region (FIG. 2Y) and the nucleus pulposus region (FIG. 2Z). Resolvable peaks include: A: isoleucine, leucine, valine; B: lactate, isoleucine; C: alanine; D: isoleucine, leucine; E: lysine, leucine; F: N-Acetyl resonance of chonroitin sulfate; G: glutamine; H: glutamate, proline; I: glutamine, hydroxyproline; J: lysine; K: choline; L: phosphocholine; M: hydroxyproline; N: glycine; O: C—H resonances of chondroitin sulfate; P: ethanoloamine; the bracketed region indicates the C—H resonances of chondroitin sulfate.

FIGS. 3X, 3Y, 3Z show representative 1-D HR-MAS spectra acquired for a Thompson Grade 5 disc (FIG. 3X) from the annulus fibrosus region (FIG. 3Y) and the nucleus pulposus region (FIG. 3Z). Resolvable peaks include: A: isoleucine, leucine, valine; B: lactate, isoleucine; C: alanine; D: isoleucine, leucine; E: lysine, leucine; F: N-Acetyl resonance of chonroitin sulfate, Proline, glutamate; G: glutamine; H: glutamate, proline; I: glutamine, hydroxyproline; J: lysine; K: choline; L: phosphocholine; M: hydroxyproline; N: glycine; O: C—H resonances of chondroitin sulfate; P: ethanoloamine.

FIGS. 4A-4D show, as described in Table 1, the graphical representation of the distribution of integrated N-Acetyl/Cho (FIG. 4A) and Cho/Carb (FIG. 4B) of the annulus fibrosus as well as N-Acetyl/Cho (FIG. 4C) and Cho/Carb (FIG. 4D) of the nucleus pulposus with respect to Thompson Grade. Cho/Carb shows the largest statistical significance.

FIG. 5A shows a rotor synchronized adiabatic TOCSY spectrum of healthy disc material, with an 80 ms mixing time. The horizontal axis is the sum of projections and the vertical axis is a high-resolution 1-D spectrum. The three-letter amino acid code was used to designate amino acid crosspeaks.

FIGS. 7A, 7B show exemplary spectra taken from an experiment performed on certain intervertebral discs using NMR spectroscopy.

FIGS. 12A and 12B show a T2-weighted MRI image of another ex-vivo bovine spine specimen, and corresponding NMR spectrum of a voxel region in a disc nucleus of the spine, respectively, according to certain present embodiments.

FIGS. 13A and 13B show similar respective images for the ex-vivo bovine spine featured in FIGS. 12A-B, taken at a first time interval after Papain injection into the disc evaluated.

FIGS. 14A and 14B show similar respective images for the ex-vivo bovine spine featured in FIGS. 12A-B, taken at a second time interval after Papain injection into the disc evaluated.

FIGS. 15A and 15B show similar respective images for the ex-vivo bovine spine featured in FIGS. 12A-B, taken at a third time interval after Papain injection into the disc evaluated.

FIGS. 16A and 16B show a T2-weighted MRI image of a cadaveric spine specimen, and corresponding NMR spectrum of a voxel region in a disc nucleus of the spine, respectively, according to certain present embodiments.

FIGS. 17A and 17B show a T2-weighted MRI image of another cadaveric spine specimen, and corresponding NMR spectrum of a voxel region in a disc nucleus of the spine, respectively, according to certain present embodiments.

FIGS. 18A and 18B show a T2-weighted MRI image of another cadaveric spine specimen, and corresponding NMR spectrum of a voxel region in a disc nucleus of the spine, respectively, according to certain present embodiments.

FIGS. 19A and 19B show a T2-weighted MRI image of another cadaveric spine specimen, and corresponding NMR spectrum of a voxel region in a disc nucleus of the spine, respectively, according to certain present embodiments.

FIGS. 20A and 20B show a T2-weighted MRI image of another cadaveric spine specimen, and corresponding NMR spectrum of a voxel region in a disc nucleus of the spine, respectively, according to certain present embodiments.

DETAILED DESCRIPTION OF THE INVENTION

Figures 1X, 1Y, 1Z:
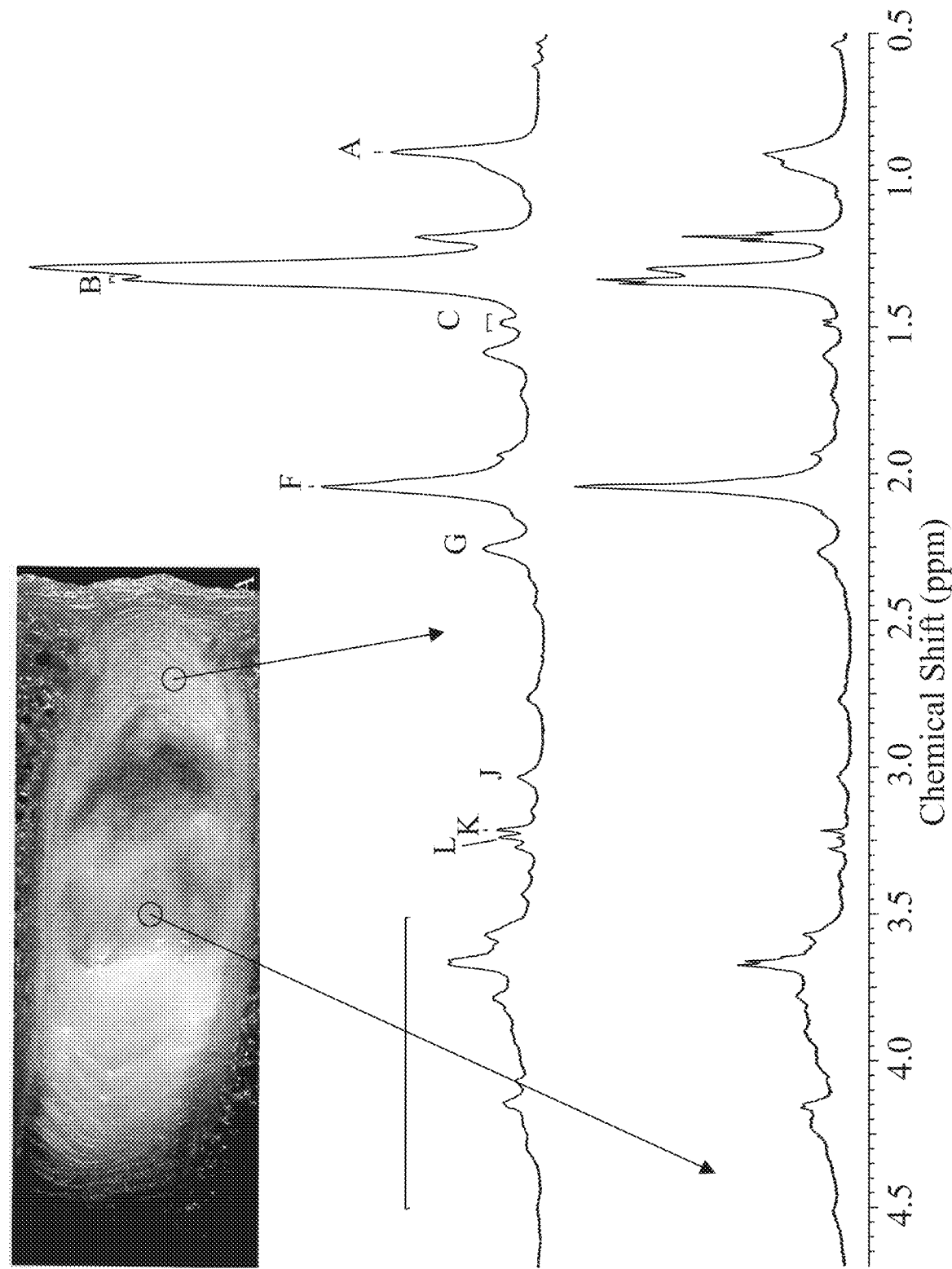

Referring more specifically to the drawings, for illustrative purposes the present invention is embodied in the apparatus generally shown in FIG. 1X through FIG. 6B and Table 1, and as further developed according to certain particular modes as reflected in FIGS. 7A-B and Table 2. It will be appreciated that the apparatus may vary as to configuration and as to details of the parts, and that the method may vary as to the specific steps and sequence, without departing from the basic concepts as disclosed herein.

The ability to characterize disc degeneration in regard to particular material or chemical constituents using NMR spectroscopy is herein disclosed. Non-invasive correlations between NMR spectra indicia and Thompson grade are made, yielding tremendous benefit to various uses in medicine and research. The present invention is highly beneficial with respect to providing a non-invasive ability to identify and characterize markers associated with the particular state or locality of disc degeneration, and in further particular relation to localization of pain or pain generating factors.

Various aspects, modes, embodiments, variations, and features of the present invention will be made clear by reference to one or more experimental studies performed, and accompanying discussion, as provided by way of one or more examples immediately below.

Example 1

1. Overview

The goal of this study was to determine the ability of high-resolution magic angle spinning (HR-MAS) NMR spectroscopy to distinguish different stages of intervertebral disc degeneration. 17 discs were removed from human cadavers and analyzed using one- and two-dimensional (TOCSY) $^1$H HR-MAS spectroscopy, and $T_1$ and $T_2$ relaxation time measurements to determine the chemical composition and changes in chemical environment of discs with increasing levels of degeneration (Thompson grade). Significant findings include that spectra were very similar for samples taken from annular and nuclear regions of discs and that visually apparent changes were observed in the spectra of the annular and nuclear samples from discs with increasing Thompson grade. Area ratios of the N-Acetyl to choline regions, and choline to carbohydrate regions of the spectra allowed for discrimination between discs of increasing Thompson grade with minimal overlap of individual ratios. Changes in $T_1$ and $T_2$ relaxation times of the chemical constituents of disc spectra seemed to reflect both changes in dehydration of the disc and the degree of breakdown of the proteoglycan and collagen matrices with increasing Thompson grade. The results of this study support the using of in vivo spectroscopy for detecting chemical changes associated with disc degeneration.

Several in vivo MRI studies have been performed in an attempt to better characterize IVDD. $T_1$ and $T_2$ weighted MRI has been used to analyze the structure of intervertebral discs. A decrease in $T_2$-weighted signal intensity with increased lumbar disc degeneration has been alleged. $T_1$ values of water in degraded cartilage decrease significantly in samples with degeneration. Changes have been allegedly observed in $T_2$ relaxation times of water with degeneration of articular cartilage as well. Diffusion weighted imaging has also been used to study disc and cartilage, showing a decrease in water content as a correlate to a degenerative state. In MRI of the cervical spine, as age increases, dehydration occurs more evenly across all discs. One research group speculates that this is due to a more uniform degeneration than that due to injury or recurrent stress. These MR imaging findings increase the accuracy of a gross morphological grading system, but degenerative states could be more effectively and quantitatively measured using a method based on measurement of the chemical constituents detectable through in vivo spectroscopy.

There is currently a great need for non-invasive techniques to better characterize the metabolic composition of intact disc tissue in vivo. Conventional methods for determining chemical composition require the extraction of proteins through biochemical means, which in turn destroy the tissue and prevent further study (e.g., biological assays or mechanical tests). HR-MAS NMR spectroscopy is a non-destructive technique that has been successfully used to characterize the composition of various intact biological tissues. Cartilage degeneration has been modeled using collagenases which degrade bovine nasal cartilage, and the degradation products have been studied using high-resolution magic angle spinning (HR-MAS) NMR spectroscopy. This allowed the amino acid products of the collagen triple helix to be compared to the natural degradation of bovine tissue and provided a model of human tissue degradation. However, the differing levels of biochemical and mechanical degradation associated with varying degrees of intermediary degradation are still characterized using a single Thompson Grade, which underscores the need for a more descriptive grading scale than the current method.

The purpose of this study was to demonstrate use of HR-MAS spectroscopy to assess the chemical changes associated with intervertebral disc degeneration. Suitable modifications and adaptations of these HR-MAS tools and methods may thus be made in order to measure and correlate similar metabolic changes when performing in vivo magnetic resonance spectroscopy for characterizing degree of disc degeneration.

HR-MAS spectroscopy was applied to intervertebral discs spanning a range of Thompson grades in order to identify the NMR observable chemicals and to determine the difference in the ratios of these chemicals between discs at different stages of degeneration. Relaxation time measurements were also performed to characterize changes in the environment of chemical disc constituents with disc degeneration and their molecular degrees of freedom.

2. Materials and Methods

A. Tissue Acquisition

This study was approved by our Institutional Review Board. Lumbar spines were surgically removed from n=17 human cadavers (range: 22 to 85 years) and frozen at −80° C. The harvested spines were then separated with an autopsy saw and scalpel. The surrounding bone of the intervertebral body was removed and separated from the intervertebral disc. 3 mm biopsy punches were taken in the annulus fibrosus and nucleus pulposus regions of the removed discs. These punches were taken in close proximity to one another and were cylindrically symmetrical. The average mass was 15.2±3.4 mg. Three side-by-side samples, from a given location, were also used to test for spectral reproducibility. The Thompson Grading was performed in consensus readings with adherence to the Thompson Grading scale. Altogether, 8 Thompson grade 1, 6 Thompson grade 3 and 6 Thompson grade 5 samples were studied.

B. HR-MAS Data Acquisition

HR-MAS data were acquired at 1.0±0.5° C. and a 2,250 Hz spin rate using a Varian INOVA spectrometer operating at 11.75 T (500 MHz for $^1H$) and equipped with a 4 mm gHX nanoprobe. For one-dimensional spectra, 40,000 complex points were acquired over a 20,000 Hz (40 ppm) spectral width, with a 90° pulse width, 2 s HOD presaturation period, 32 transients, 8 s repetition time (>5 times the longest $T_1$ relaxation time), 2 s acquisition time (>5 times the longest T2 relaxation time), and a 3:36 min total acquisition time. Samples were analyzed using custom designed 18 μl zirconium rotors, containing an ellipsoid shaped sample chamber and an airtight screw top plug to prevent leakage. For each sample, 3.0 μl of deuterium oxide containing 0.75 wt % 3-(trimethylsilyl)propionic-2,2,3,3-$d_4$ acid ($D_2O$+TSP, Sigma-Aldrich) were pipetted into the bottom of the rotor, after which the tissue samples were weighed and then added.

Longitudinal ($T_1$) relaxation time measurements were acquired using an inversion recovery pulse sequence with variable delay times from 0.01 to 2.00 s. Transverse ($T_2$) relaxation time measurements were acquired using a rotor-synchronized (i.e., τ delay=n×(spin rate)$^{-1}$, where n is an even number) Carr-Purcell-Meiboom-Gill pulse sequence with echo times ranging from 10 to 128 ms. For two dimensional TOCSY spectra, 4096 complex points were acquired over a 20,000 Hz spectral width in the direct dimension (F2), while 256 complex points were acquired over a 6,500 Hz spectral width in the indirect dimension ($F_1$). TOCSY spectra were acquired with a 2 s HOD presaturation/relaxation delay, 0.2 s acquisition time, 32 steady state pulses (1st increment only), 16 transients/increment, mixing times ranging from 10 to 80 ms, phase sensitive using States-Habercorn, for a total experiment time of approximately 5 hrs, 12 min. To minimize the effects of $B_0$ and $B_1$ inhomogeneities, rotor-synchronized constant adiabaticity WURST-8 adiabatic pulses (33) were used for isotropic mixing, and were generated using the "Pandora's Box" pulse shape generator (Pbox, Varian) with a B1 field of 6,500 Hz and duration of 444 ms (1/spin rate). One-dimensional spectra were acquired before and after each two-dimensional experiment to assess metabolic degradation. $T_1$ and $T_2$ relaxation time measurements were taken from the nucleus (n=9) and the annulus (n=12) of healthy and degenerate discs.

C. Data Processing

Data were processed online using Varian VNMR 6.1C software (Varian, Inc., Palo Alto), or offline using ACD/Labs 1 D and 2D NMR processing software, version 7.0 (Advanced Chemistry Development, Inc. Toronto). One dimensional FIDs were apodized with an exponential function, with a line broadening factor equal to the inverse of the acquisition time, Fourier transformed, phase corrected, and referenced to TSP at 0.0 ppm. Relaxation times were calculated using exponential least squares regression analysis. Relaxation times were only used if the list (least) squares fit had a standard error of less than 10%. TOCSY data were processed using 3×N linear predictions in F1, zero filled to 1024 complex points (F1 only), and apodized using Gaussian weighting in both dimensions.

Cross peaks were assigned using previously reported chemical shift values from the literature. Based upon visual assessment of the data, three spectral regions from the 1 D data were binned as follows: the N-acetyl region (1.90-2.10 ppm); the choline head group (Cho) region (3.15-3.30 ppm);

and the carbohydrate (Carb) region (3.50-4.20 ppm). Three ratios, abbreviated N-Acetyl/Cho, Cho/Carb, and N-Acetyl/Carb, were then calculated for each spectrum, after setting the integrated area of the carbohydrate region to 1.00. For each Thompson grade, the mean ratios and standard deviations were calculated and a Student's t test was performed to determine the statistical significance of the data, where a p-value <0.05 was considered significant.

3. Results

A. Thompson Grade Differentiation

Representative one-dimensional HR-MAS spectra of the annular and nuclear regions of intervertebral discs with Thompson grades 1, 3, and 5 are shown in FIGS. 1-3.

FIGS. 1X, 1Y, 1Z show a representative 1-D HR-MAS spectra acquired from a Thompson Grade 1 disc (FIG. 1X) from the annulus fibrosus region (spectra at FIG. 1Y) and the nucleus pulposus region (spectra located at FIG. 1Z). Arrows illustrate associations between the various spectra shown at FIGS. 1Y, 1Z and the respective representative portion(s) of the disc being evaluated and shown at FIG. 1X. The circles indicate the representative location of 3 mm punch biopsies taken from the disc. Resolvable peaks include: A: isoleucine, leucine, valine; B: lactate, isoleucine; C: alanine; F: N-Acetyl resonance of chonroitin sulfate; G: glutamine; J: lysine; K: choline; L: phosphocholine; the bracketed region indicates the C—H resonances of chondroitin sulfate.

Thompson grade 1 disc material is characterized by its stiff pliable annular ring and hydrated gel core (FIG. 1X). 3 mm punch biopsies were taken from annular and nuclear regions of intervertebral discs and the corresponding HR-MAS spectra are shown (FIG. 1Y, 1Z, respectively). Both HR-MAS spectra demonstrate a large N-acetyl resonance centered at 2.04 ppm, and carbohydrate resonances attributed to chondroitin sulfate in the region from 3.5 to 4.0 ppm. Additionally, resonances due to lactate (1.33 ppm), lipid (ppm), the choline head group (3.21-3.25 ppm), and several amino acids (alanine (1.49 ppm), isoleucine, leucine, and valine) are also observable. Interestingly, in lower Thompson grade discs, consistently greater spectral resolution was observed in the nucleus (FIG. 1Z) as compared to the annulus (FIG. 1Y).

Figures 2X, 2Y, 2Z:
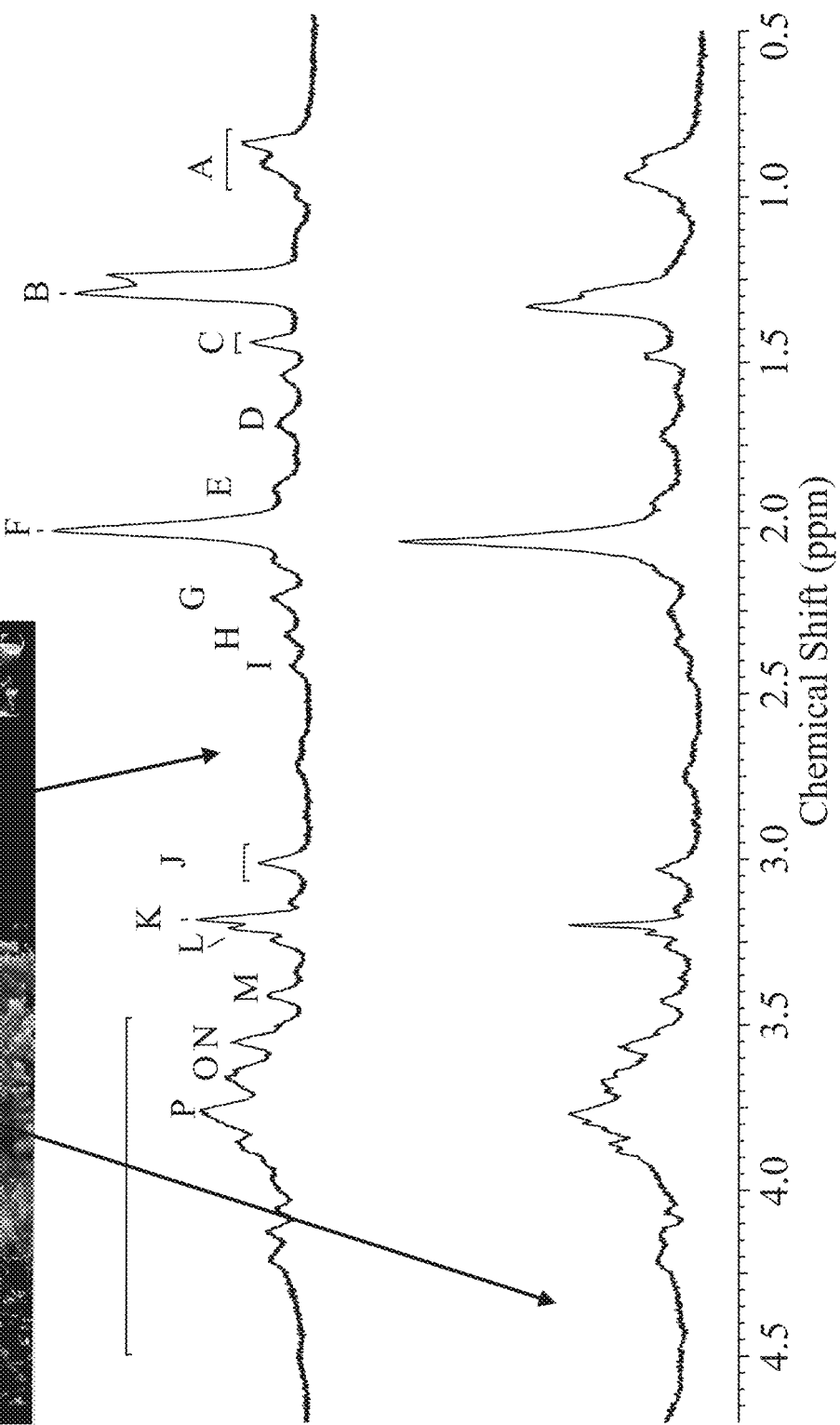
Figure 4C:
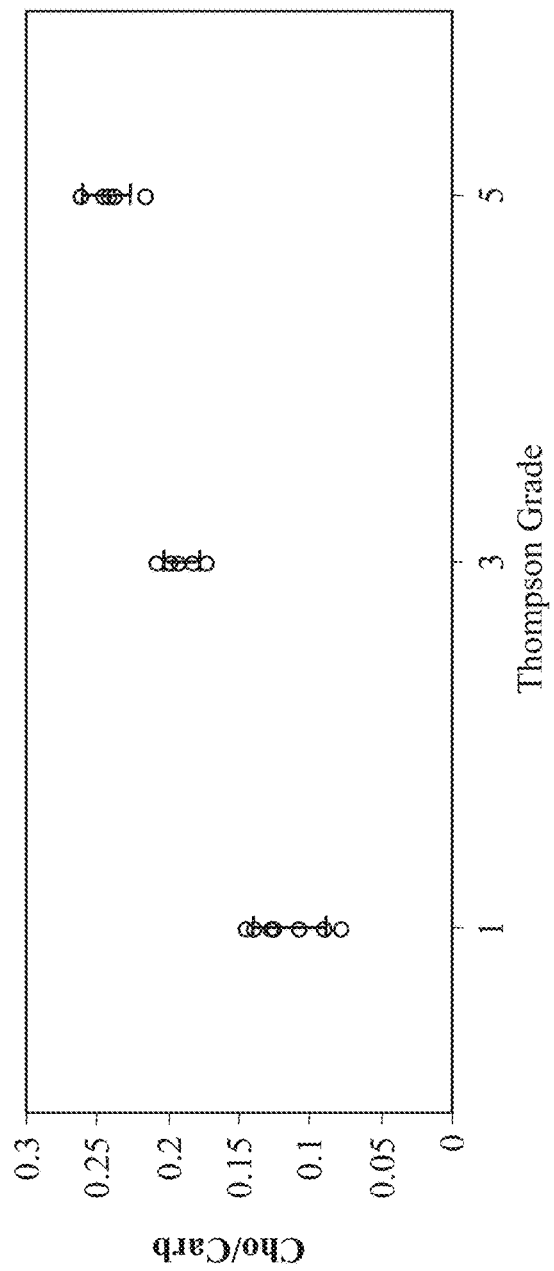
Figure 4D:
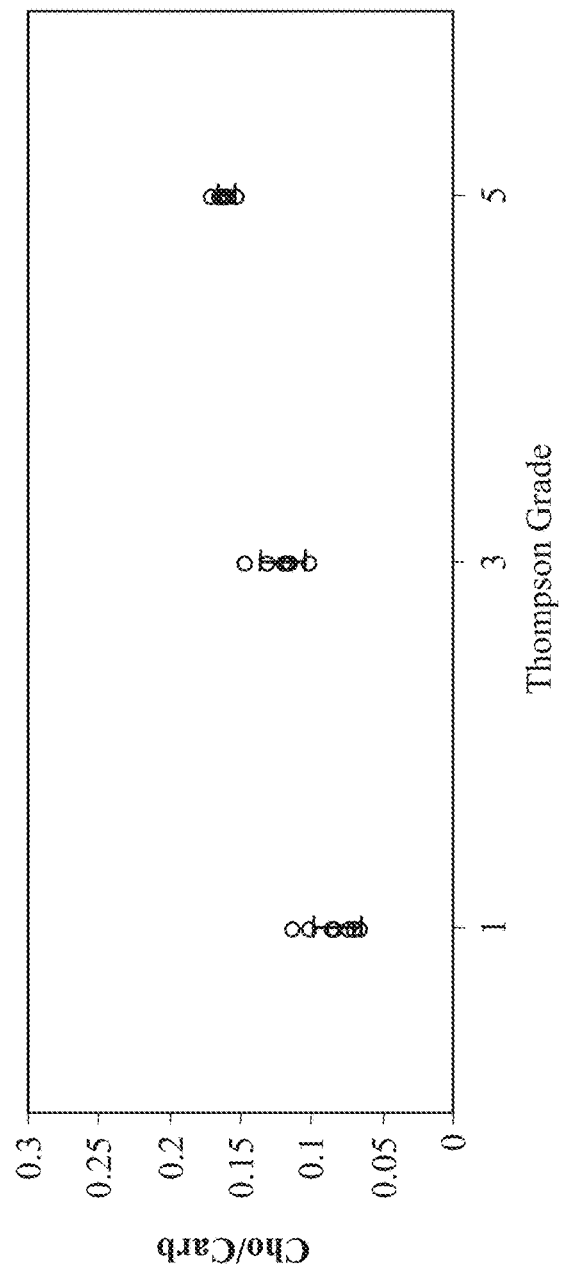

FIGS. 2X, 2Y, 2Z show a moderately degenerated Thompson Grade 3 disc (FIG. 2X) and corresponding HR-MAS spectra taken from the annulus fibrosus (FIG. 2Y) and the nucleus pulposus (FIG. 2Z). Morphological changes associated with Thompson grade 3 are dehydration of the disc coupled with a mechanical disruption of the disc matrix. Spectroscopically, the nucleus and annulus of Thompson Grade 3 demonstrate an increase in spectral resolution in the carbohydrate region of the spectrum compared to Thompson Grade 1 disc (FIG. 1X, 1Y, respectively). There is also an increase in the resonances containing the choline headgroup (3.21 ppm).

Thompson grade 5 discs (FIG. 3X) pathologically demonstrate a further dehydration of the disc, mucinous infiltration and extensive disruptions in the annulus, fibrous tissue replacement of the nucleus pulposus, and a loss of visual distinction between the annular and nuclear regions. Spectroscopically, there is a further increase in the resolution and intensity of the resonances in the choline and carbohydrate regions of the spectra. There is also a visual decrease in the intensity of the N-acetyl resonance and an increase in the number and intensity of resonances due to free amino acids.

Table 1 shows integral ratios for annulus fibrosus (A) and nucleus pulposus (B) and student's t-test results. Individual and mean±sdev N-Acetyl/Cho, Cho/Carb, and N-Acetyl/Carb ratios for Thompson grades 1, 3, and 5 discs are statistically compared. Thompson grades 2 and 4 discs were omitted from this study due to the subjectivity of the Thompson grading scale. For both the nucleus and annulus, the mean N-Acetyl/Cho, and Cho/Carb ratios showed significant differences between all three Thompson grades, while the N-Acetyl/Carb ratio was only significantly different between nucleus samples taken from Thompson 3 versus 5 discs.

For grades 1 vs. 3 the difference of ratios 1 and 2 were significant when comparing any two grades, for both the annulus and nucleus. N-Acetyl/Carb was only significant when comparing grade 1 to grade 5 of the nucleus. N-Acetyl/Cho=Integral (1.90-2.10 ppm)/Integral (3.15-3.30 ppm), Cho/Carb=Integral (3.15-3.30 ppm)/Integral (3.50-4.20 ppm), N-Acetyl/Carb=Integral (1.90-2.10 ppm)/Integral (3.50-4.20 ppm).

In FIGS. 4A-4D, individual N-Acetyl/Cho (FIGS. 4A and 4B), and Cho/Carb (FIGS. 4C and 4D) ratios from the annulus (top) and nucleus (bottom) for the three Thompson grades are plotted in order to assess the overlap of individual measurements. For the N-Acetyl/Cho ratio, there was no overlap of individual nucleus values between Thompson grade 1 and 5 discs, there was substantial overlap of individual values for all other comparisons. For the Cho/Carb ratio, there was no overlap of individual annulus values between all three Thompson grades and no overlap of individual nucleus values between Thompson grade 1 and 5.

B. Total Correlation Spectroscopy (TOCSY)

Figure 5A:
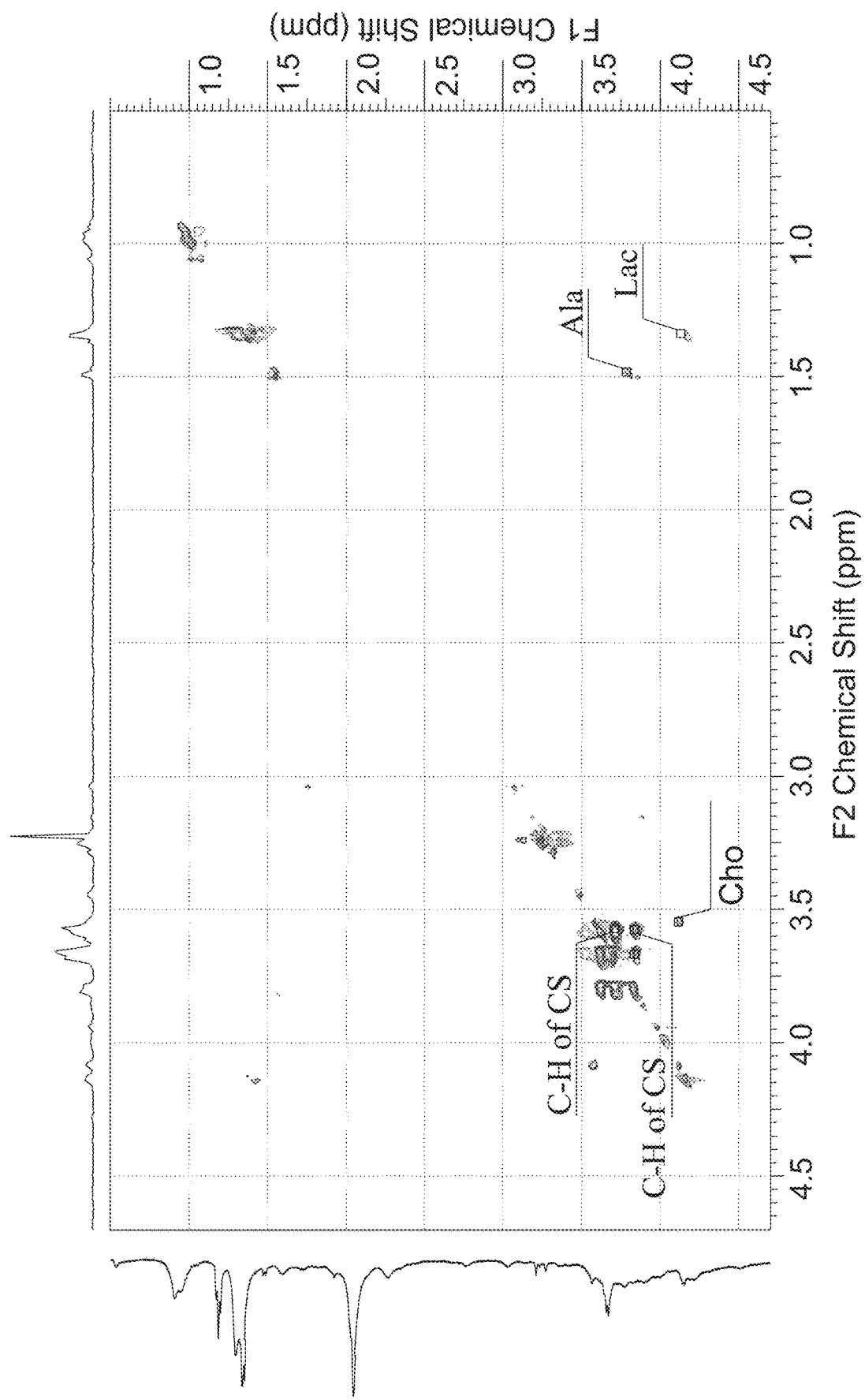
FIG. 5B shows a rotor synchronized adiabatic TOCSY spectrum of degenerate disc, with an 80 ms mixing time. In the degenerate spectrum there is an increase in signal in the amino acids as well as choline containing compounds, which are not present in the healthy spectrum.
Figure 5B:
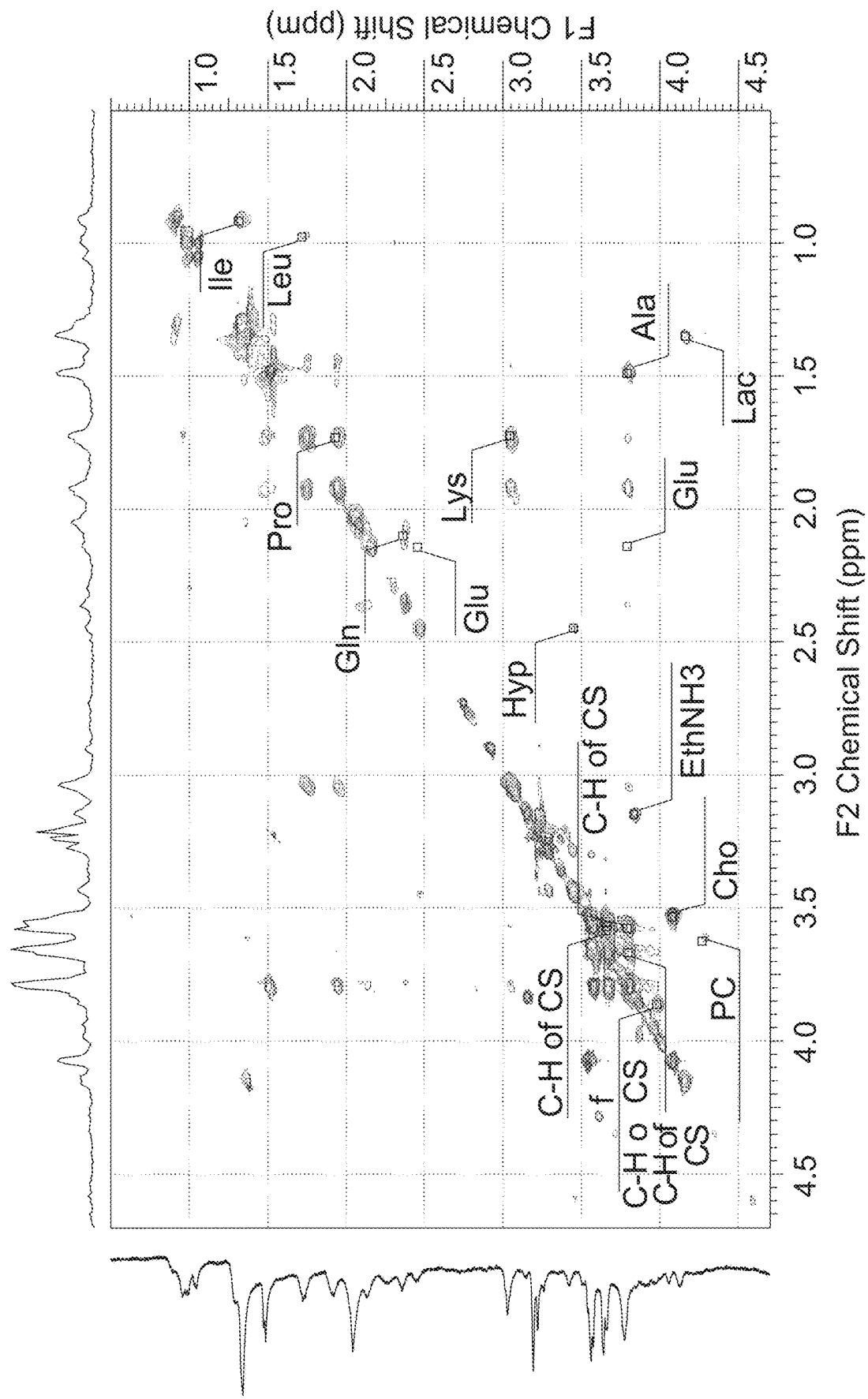

To assign the resonances observed in the one-dimensional proton spectra, two-dimensional TOCSY spectra were acquired and the chemical shifts of the crosspeaks observed were compared to previously reported chemical shift values. FIG. 5A shows a TOCSY spectrum of a Thompson grade 1 intervertebral disc. In all eight of the Thompson grade 1 discs studied, only a limited number of crosspeaks could be observed, including those due to alanine (1.49, 3.79 ppm), lactate (1.35, 4.16 ppm), and the protons related to the carbohydrate portion of the proteoglycan polymers. In contrast, the TOCSY spectrum of the six degenerated Thompson grade 5 discs studied (FIG. 5B), exhibited many more detectable crosspeaks, including isoleucine (0.92, 1.32 ppm), leucine (0.98, 1.72 ppm), lysine (1.73, 3.04 ppm), proline (1.73, 1.93 ppm), glutamine (2.14, 2.46 ppm and 2.14, 3.79 ppm), glutamate (2.1, 2.36 ppm), hydroxyproline (2.45, 3.45 ppm), and ethanolamine (3.15, 3.83 ppm). TOCSY experiments demonstrated that the resolvable resonances in the carbohydrate region (3.5-4.2 ppm) of the 1-D HR-MAS spectrum were composite peaks arising from multiple amino acids, ethanolamine containing compounds, as well as the sugar C—H protons of the breakdown products of chondroitin sulfate. The 1-D HR-MAS spectra of all discs studied exhibited two singlets at 3.21 and 3.23 ppm, which correspond to the chemical shifts of free choline (Cho) and phosphocholine (PC) respectively. TOCSY experiments also demonstrated cross peaks for the methylene protons of Cho at 3.55×4.07 ppm and PC at 3.62×4.18 ppm. There are also several other smaller, broader resonances in the choline region of the spectrum, which remain unidentified.

C. $T_1$ and $T_2$ Relaxation Times

Figure 6A:
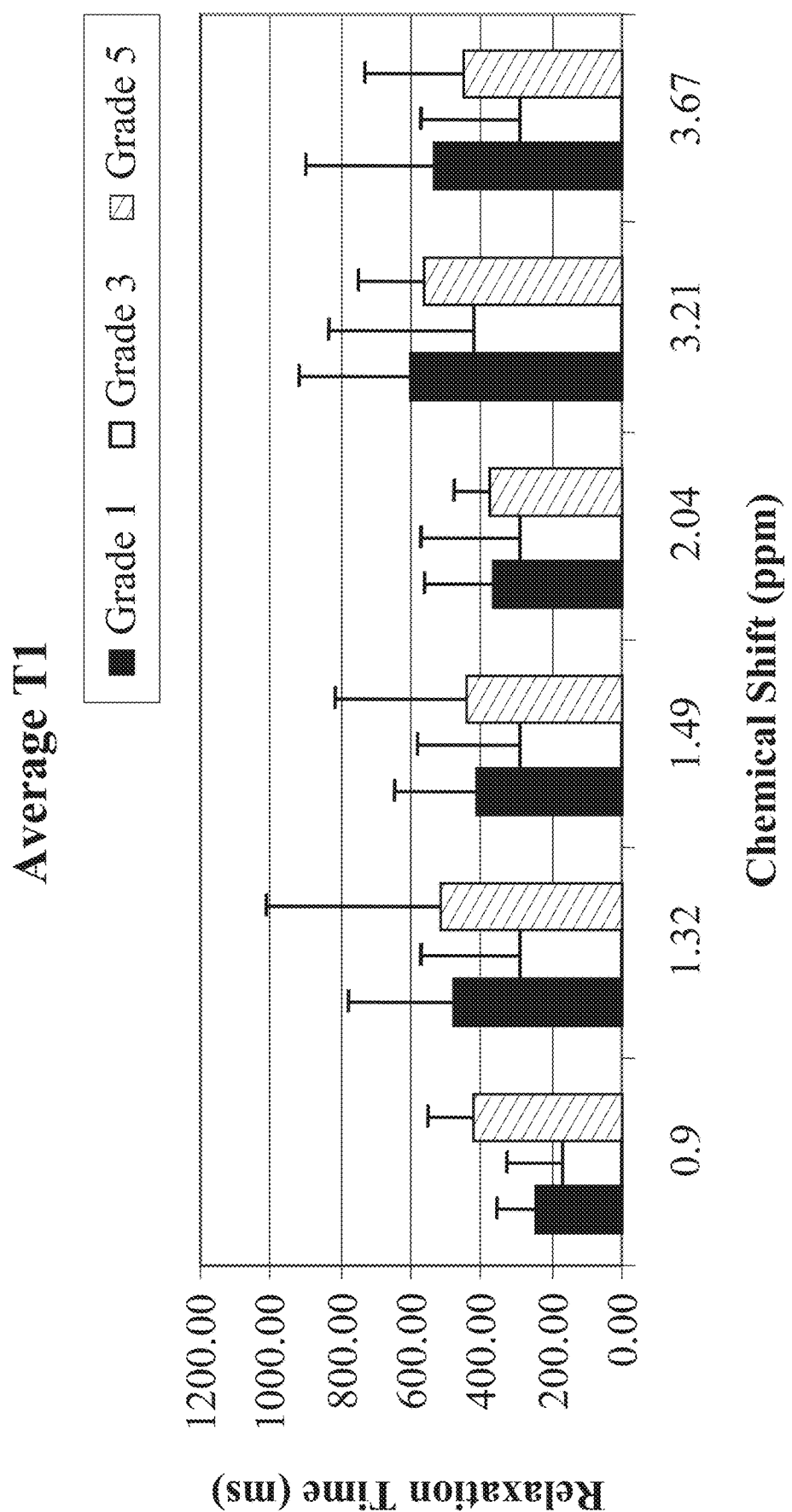
FIG. 6A shows a graphical representation of the average spin-lattice relaxation times of the following compounds: 0.9 ppm: Isoleucine, Leucine, and Valine, 1.32 ppm: Lactate, 1.49 ppm: Alanine, 2.04 ppm: N-Acetyl moiety of Chondroitin sulfate, 3.21 ppm: Choline containing compounds, 3.67 ppm: C—H of the carbohydrate residue associated with the Chondroitin sulfate polymer.
Figure 6B:
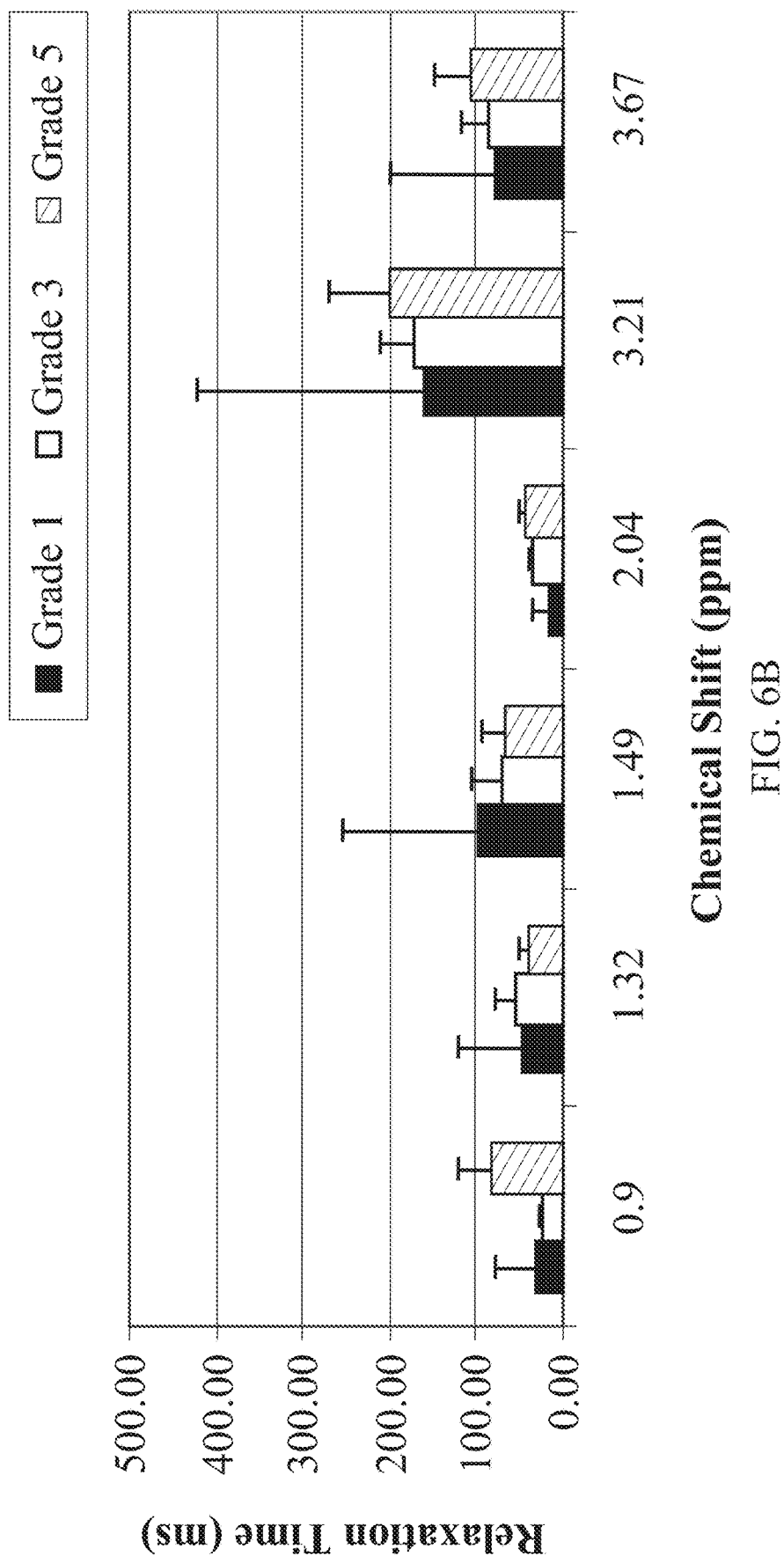
FIG. 6B shows a graphical representation of the average spin-spin relaxation times of the previously mentioned compounds. (*) Denotes peaks with very large standard deviations due to low signal intensity.
Figure 8A:
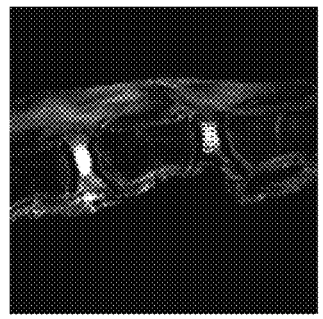
FIGS. 8A and 8B show a T2-weighted MRI image of an ex-vivo bovine spine specimen, and corresponding NMR spectrum of a voxel region in a disc nucleus of the spine, respectively, according to certain present embodiments.
Figure 9A:
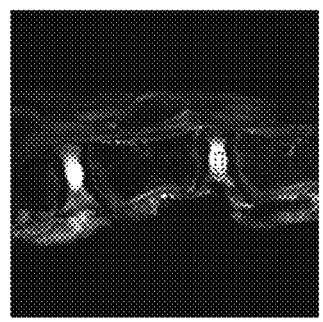
FIGS. 9A and 9B show similar respective images for the ex-vivo bovine spine featured in FIGS. 8A-B, taken at a first time interval after Papain injection into the disc evaluated.
Figure 10A:
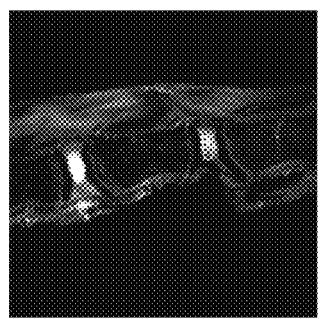
FIGS. 10A and 10B show similar respective images for the ex-vivo bovine spine featured in FIGS. 8A-B, taken at a second time interval after Papain injection into the disc evaluated.
Figure 11A:
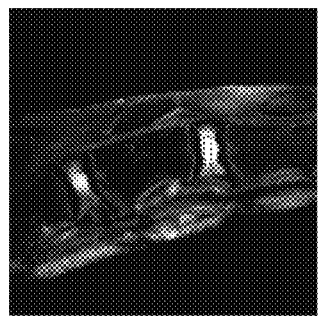
FIGS. 11A and 11B show similar respective images for the ex-vivo bovine spine featured in FIGS. 8A-B, taken at a third time interval after Papain injection into the disc evaluated.
Figure 8B:
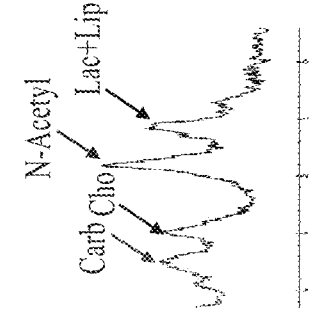
Figure 9B:
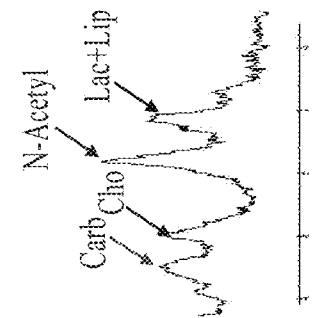
Figure 10B:
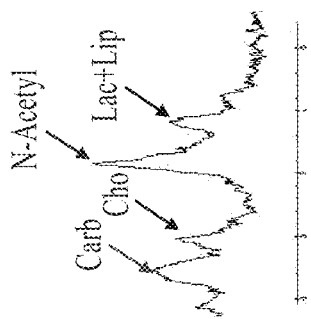
Figure 11B:
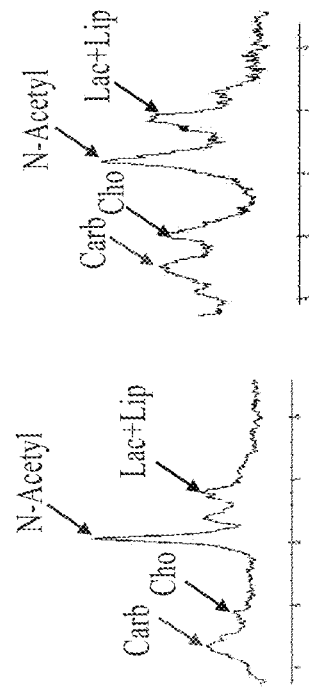

FIGS. 6A and 6B, respectively, show the average $T_1$ and $T_2$ relaxation times for resolvable resonances in the Thompson Grade 1, 3, and 5 discs. Only $T_1$ and $T_2$ relaxation times of resonances that could be resolved in nucleus and annulus spectra of all of the Thompson grades were measured. This resulted in the measurement of $T_1$ and $T_2$ relaxation times for resonances at 0.9, 1.32, 1.49, 2.04, 3.21 and 3.67 ppm. There was no significant difference observed between $T_1$ and $T_2$ relaxation times measured in the nucleus and annulus, therefore the relaxation times of theses regions were combined to increase the statistical significance of the disc grade comparisons. The average $T_1$ and $T_2$ measurements for these resonances from each of the Thompson grades demonstrated large variability yielding no significant trend in metabolite $T_1$ and $T_2$ with increasing disc degeneration. However, there was an observable trend for $T_1$ relaxation times with increasing Thompson grade. The observable trend for $T_1$ values was an initial decrease for Thompson grade 3 discs and subsequent increase for Thompson grade 5 discs. For T2, there was no consistent trend for all of the observed resonances, however, there was an increasing trend for the N-Acetyl (2.04 ppm), Choline (3.21 ppm) and the carbohydrate C—H resonances (3.67 ppm) with increasing Thompson grade.

4. Discussion

Proton HR-MAS spectra were very similar for samples taken from annular and nuclear regions of intervertebral discs, with both spectra demonstrating a large N-acetyl resonance and carbohydrate resonances primarily from chondroitin sulfate, as well as resonances from choline containing compounds, lipid/lactate and several amino acids. Due to the more gel like nature of the nucleus, consistently greater spectral resolution was observed in the nucleus as compared to the annulus for Thompson grade 1 discs.

A substantial result observed in this study was that significant, visually apparent changes were observed in the proton HR-MAS spectra of the annular and nuclear samples from discs with increasing Thompson grade. Specifically, there was a grade dependent increase in number of observable resonances and a sharpening of line widths of resonances in the 3.5-4.0 ppm region of the spectrum, corresponding to a loss of the "broad component" in this region. Additionally, there was an increase in the signal intensity of resonances in the choline containing compound region of the spectrum, and a relative decrease in the N-Acetyl resonance.

Similarly, the number and intensity of cross peaks in TOCSY disc spectra increased with increasing Thompson grade. A large number of the cross peaks appearing in TOCSY spectra of degraded nucleus and annulus were due to the amino acids hydroxyproline, proline, glycine, lysine, leucine, isoleucine, alanine, valine, glutamine and glutamate and ethanolamine, many of which are components of collagen. Amino acid resonances also dominate the 1-D proton HR-MAS spectra of both nucleus and annulus in Thompson grade 5 discs. The observation of amino acids due to the breakdown of collagen has been previously observed in NMR studies of cartilage digestion using metalloproteinases. Metalloproteinases (MMPs) have been suspected to play an important role in disc degeneration by disrupting the collagen matrix that supports the disc. As the collagen network disintegrates and the collagen helices break down into their constituent amino acids, those resonances become more visible in both 1 D and 2D HR-MAS spectra.

There was also metabolic evidence of chondroitin sulfate breakdown with disc degeneration. This conclusion is based on the increase in intensity and resolution of carbohydrate C—H resonances (3.5-4.0 ppm) and the relative reduction in the N-Acetyl resonance of chondroitin sulfate (2.04 ppm) in proton HR-MAS spectra taken from the annulus and nucleus of Thompson grade 3 and 5 discs as compared to Thompson grade 1. Prior $^1$H and $^{13}$C HR-MAS NMR investigations on native and enzymatically digested bovine nasal cartilage have shown a change in the composition of the N-acetyl resonance from being initially the N-acetyl resonance in non-digested cartilage to a composite peak containing the N-acetyl and amino acid resonances. Chondroitin sulfate concentration decreases with disc degeneration. TOCSY studies have demonstrated that the resolvable resonances in the 3.5-4.0 ppm region of degenerated disc spectra also arise from a complex mixture of compounds including multiple amino acids, ethanolamine containing compounds and the C—H resonances of carbohydrates. The complete assignment of resonances in degenerated disk spectra will therefore require human disc digestion studies and correlation with biochemical assays for chondroitin sulfate (e.g. dimethylmethylene blue (DMMB) assay) and collagen (collagenase).

Based on the observed changes in the N-Acetyl resonance, and resonances in the choline and the carbohydrate/amino acid regions of the HR-MAS spectrum, the N-Acetyl/Cho, Cho/Carb, and N-Acetyl/Carb ratios were investigated to determine which ratios provided the best discrimination of Thompson grade. Both the mean N-Acetyl/Cho, and Cho/Carb ratios showed significant differences between all three Thompson grades, with the Cho/Carb ratio demonstrating the least overlap between individual values for all three Thompson grades.

The Cho/Carb ratio had no overlap between the three Thompson grades for spectra taken from the annulus and minimal overlap for spectra taken from the nucleus. This is in particular beneficial since, for in vivo spectroscopy, spectra acquisition solely from either the nucleus or annulus of the disc should thus not be required in many circumstances. This is a benefit due both to their close relative proximity and signal to noise considerations.

The N-Acetyl/Cho ratio may also prove useful for in vivo spectroscopy of disc degeneration since the N-Acetyl resonance is the largest peak in the Thompson 1 and 3 discs and it was reduced to level that was less than or equal to the choline and carbohydrate regions of the spectrum in Thompson grade 5 discs. In fact, Thompson grade 5 spectra from both the nucleus and annulus can be visually separated from Thompson grade 1 and 3 disc spectra based on the relative reduction of the N-acetyl peak to the choline and carbohydrate regions.

In prior studies, investigators have studied water spin-lattice and spin-spin relaxation times in an attempt to characterize disc and cartilage degeneration. More hydrated tissue is known to have a longer water $T_1$ and $T_2$ and are shortened with disc degeneration, presumably due to tissue water loss (14). No prior reports correlate $T_1$ and $T_2$ changes of the disc degenerative products with Thompson grade.

In this study the average $T_1$ and $T_2$ measurements of the disc breakdown products demonstrated large variability. However, there was an observable trend in $T_1$ relaxation times. The trend for $T_1$ values was an initial decrease for Thompson grade 3 discs and subsequent increase for Thompson grade 5 discs. The observed initial shortening of breakdown products $T_1$'s in Thompson grade 3 discs could be for example due to the loss of water with disc degeneration. The subsequent increase of $T_1$'s in Thompson grade 5 discs could be for example due to an increase in mobility of the breakdown products as they are released from the proteoglycan and collagen matrices.

Regarding observed changes in $T_2$, no clear trend exists across all the breakdown products. $T_1$ and $T_2$ measurements of both water and degradation products in larger numbers of degenerated discs would provide further useful information to understand the relaxation times measured in this study.

5. Summary

In summary, proton HR-MAS provides spectra that are very similar for samples taken from annular and nuclear regions of intervertebral discs. Significant, visually apparent changes are observable in the proton HR-MAS spectra of the annular and nuclear samples from discs with increasing Thompson grade. Quantitatively, both metabolite peak areas ratios of the resonances in the N-acetyl to choline regions, and choline to carbohydrate regions of the spectra are useful to discriminate discs of increasing Thompson grade with minimal overlap of individual ratios. Changes in $T_1$ and T2 relaxation times of the chemical constituents of disc spectra do not mirror changes in water relaxation times previously reported for disc degeneration. Changes in relaxation times of the chemical constituents of disc spectra with increasing degeneration reflect both changes in dehydration of the disc and the degree of breakdown of the proteoglycan and collagen matrices with increasing Thompson grade. In vivo modalities of NMR spectroscopy will be useful for detecting chemical changes associated with disc degeneration.

In addition to the foregoing, the following references are herein incorporated in their entirety by reference thereto:
1. Haro H, Crawford, H. J. Clin. Invest. 2000; 105:143-150.
2. Mow V, Hayes, W. Basic Orthopaedic Biomechanics. In. New York: Raven Press, 1991; 339-342.
3. Thompson J P, Pearce, R. H., Schechter, M. T., Adams, M. E., Tsang, I. K., Bishop, P. B. Preliminary evalutation of a scheme for grading the gross morphology of the human intervertebral disc. Spine 1990; 15:411-415.
4. Iatridis J C, Setton, L. A., Weidenbaum, M., Mow, V. C. Alterations in the mechanical behavior of the human lumbar nucleus pulposus with degeneration and aging. In: Journal of orthopaedic research, 1997; 318-322.
5. Urban J P, McMullin, J. F. Swelling pressure of the intervertebral disc: influence of proteoglycan and collagen contents. Biorheology 1985; 1985.
6. Beall P T, Amety, S. R. et al. States of Water in Biology: NMR Data Handbook for Biomedical Applications. New York: Pergamon Press, 1984.
7. Boos N, Boesch, C. Quantitative magnetic resonance imaging of the lumbar spine: potential for investigations of water content and biochemical composition. Spine 1995:2358-2366.
8. Bottomley P A, Foster, T. H. et al. A review of normal tissue hydrogen NMR relaxation times and relaxation mechanisms from 1-100 MHz: dependence on tissue type, NMR frequency, temperature, species, excision, and age. Medical Physics 1984:425-448.
9. Lyons G, Eisenstein, S. M. et al. Biochemical changes in intervertebral disc degeneration. Biochim Biophys Acta 1981:443-453.
10. Majors A W, McDevitt, C. A. et al. A correlative analysis of T2, ADC and M T ratios with water, hydroxyproline and GAG content in excised human intervertebral disk. In: 40th Annual Meeting Orthopaedic Research Society. New Orleans, Louisiana: Orthopaedic Research Society, 1994.
11. Maroudas A. The Biology of the Intervertebral Disc. In: Ghosh P, ed. The Biology of the Intervertebral Disc. Boca Raton: CRC Press, 1988; Ch. 9.
12. Pearce R H, Grimmer, B. J. et al. Degeneration and the chemical composition of the human lumbar intervertebral disc. Journal of orthopaedic research 1987:198-205.
13. Tertti M, Paajanen, H. et al. Disc degeneration in magnetic resonance imaging: a comparative biochemical, histologic, and radiologic study in cadaver spines. Spine 1991:629-634.
14. Chui E, David C. Newitt, Mark R. Segal, Serena S. Hu, Jeffrey C. Lotz, Sharmila Majumdar. Magnetic Resonance Imaging Measurement of Relaxation and Water Diffusion in the Human Lumbar Intervertebral Disc Under Compression In Vitro. Spine 2001; 26:E437-444.
15. Gundry C R, Fritts, H. M. Magnetic resonance imaging of the musculoskeletal system: Part 8. The spine. Clin Orthop Rel Res 1997:275-287.
16. Gunzburg RPRea. A cadaveric study comparing discography, magnetic resonance imaging, histology and mechanical behavior of the human lumbar disc. Spine 1991:417-423.
17. Modic M T, Pavlicek, W. et al. Magnetic resonance imaging of intervertebral disc disease: clinical and pulse sequence considerations. Radiology 1984:103-111.
18. Modic M T, Masaryk, T. J. et al. Lumbar herniated disk disease and canal stenosis: prospective evaluation by surface coil MR, CT and myelography. ANJR 1986:709-717.
19. Modic M T, Masaryk, T. J. et al. Imaging of degenerative disc disease. Radiology 1988:177-186.
20. Sether L A, Yu, S. et al. Intervertebral disk: Normal age-related changes in M R signal intensity. Radiology 1990:385-388.
21. Pfirrmann C, Metzdorf, A., Zanetti, M. Magnetic Resonance Classification of Lumbar Intervertebral Disc Degeneration. Spine 2001; 26:1873-1878.
22. Nieminen M T, Rieppo, J., Silvennoinen, J. et al. Spatial assessment of articular cartilage proteoglycans with Gd-DTPA-enhanced T1 imaging. Magnetic Resonance in Medicine 2002; 48:640-648.
23. Mosher T J, Dardzinski, B. J., Smith, M. B. Human articular cartilage: influence of aging and early symptomatic degeneration on the spatial variation of T2-preliminary findings at 3 T. Radiology 2000; 214:259-266.
24. Boos N, Wallin, A., Boesch, C. H., Aebi, M. Quantitative M R Imaging of diurnal water content variations in lumbar intervertebral disc. In: 38th Annual Meeting, Orthopeadic Research Society. Washington, D.C.: The Orthopaedic Research Society, 1992; 165.
25. Boos N, Wallin, A., Harms, S., Vock, P., Boesch, C. H., Aebi, M. Tissue characterization of normal and herniated lumbar intervertebral discs by quantitative MRI. In: 39th Annual Meeting, Orthopaedic Research Society. San Francisco, CA: Orthopaedic Research Society, 1993; 417.
26. Burstein D, Gray, M. L. et al. Diffusion of small solutes in cartilage as measured by nuclear magnetic resonance (NMR) spectroscopy and imaging. Journal of orthopaedic research 1993:465-478.
27. Koh K, Kusaka, Y. et al. Self diffusion coefficient of water and its anisotropic property in bovine intervertebral discs analyzed by pulsed gradient NMR method. Orthop Trans 1992:483.
28. Koh K, Kusaka, Y. et al. Self diffusion coefficient of water in human intervertebral discs analyzed by pulsed gradient NMR method. In: 39th Annual Meeting Orthopaedic Research Society. San Francisco, CA, 1993.
29. Abdulkarim J A, Dhingsa, R., Finlay, D. B. Magnetic Resonance Imaging of the Cervical Spine: Frequency of Degenerative Changes in the Intervertebral Disc with Relation to Age. Clinical Radiology 2003:980-984.
30. Swanson M G, Vigneron D B, Tabatabai Z L, et al. Proton H R-MAS spectroscopy and quantitative pathologic analysis of MRI/3D-MRSI-targeted postsurgical prostate tissues. Magnetic Resonance in Medicine 2003; 50:944-954.
31. Schiller J, Naji, L., Huster, D., Kaufmann, J., Arnold, K. 1H and 13C HR-MAS NMR investigations on native and enzymatically digested bovine nasal cartilage. Magnetic Resonance Materials in Physics, Biology and Medicine 2001:19-27.
32. Carr H Y, Purcell, E. M. Effects of Diffusion on Free Precession in Nuclear Magnetic Resonance Experiments. Physical Review 1954; 94:630-638.
33. Kupce E. Applications of adiabatic pulses in biomolecular nuclear magnetic resonance. In: Methods in Enzymology, 2001; 82-111.
34. Mucci A, Schenetti, L., Volpi, N. 1H and 13C nuclear magnetic resonance identification and characterization of components of chondroitin sulfates of various origin. Carbohydrate Polymers 2000:37-45.
35. Goupille P, Jayson, M. I., Valat, J. P., Freemont, A. J. Matrix metalloproteinases: the clue to intervertebral disc degeneration? Spine 1998; 23:1612-1626.
36. Kang J D, Stefanovic-Racic, M., McIntyre, L. A., Georgescu, H. I., Evans, C. H. Toward a biochemical understanding of human intervertebral disc degeneration and herniation. Contributions of nitric oxide, interleukins, prostaglandin E2, and matrix metalloproteinases. Spine 1997; 22:1065-1073.
37. Weiler C, Nerlich, A. G., Zipperer, J., Bachmeier, B. E., Boos, N. 2002 SSE Award Competition in Basic Science: Expression of major matrix metalloproteinases is associated with intervertebral disc degradation and resorption. European Spine Journal 2002:308-320.
38. Urban J P, Roberts, S., Ralphs, J. R. The Nucleus of the Intervertebral Disc from Development to Degeneration. In: American Zoologist, 2000; 53-61.
39. Weidenbaum M, Foster, R. J., Best, B. A., Saed-Nejad, F., Nickoloff, E., Newhouse, J., Ratcliffe, A., Mow, V. C. Correlating magnetic resonance imaging with the biochemical content of the normal human intervertebral disc. Journal of orthopaedic research 1992; 10:552.

Example 2

1. Introduction

Conventional imaging methods of assessing the painful, degenerated intervertebral disc generally focus solely on morphologic criteria. However, it is well-known that there is a poor correlation between morphologic findings and patient symptoms. The goal of this in vitro study is to utilize quantitative high-resolution magic angle spinning (HR-MAS) NMR spectroscopy as a tool to accurately characterize biochemical markers in disc specimens harvested from patients undergoing surgery. Spectra from discs obtained from patients that underwent discectomy for back pain and those of a reference population, consisting of patients undergoing surgery for scoliosis, were compared in attempts to identify biochemical signatures of painful disc degeneration.

2. Materials and Methods

Spectral data were acquired at 11.7T (500 MHz), 1° C., and a 2,250 Hz spin rate using a Varian INOVA spectrometer equipped with a 4 mm gHX nanoprobe. Disc tissue removed at surgery in patients with discogenic pain (n=6) and patients with scoliosis undergoing anterior and/or posterior spinal fusion (n=4) were studied using custom designed 35 ul rotors. Quantitative proton spectra were acquired for tissue samples (mean=14.28±2.91 mg) with D2O+0.75% TSP as a standard (Sigma-Aldrich, St. Louis, MO). A spin-echo rotor synchronized Carr-Purcell-Meiboom-Gill (CPMG) pulse sequence (nt=128, at =2.0 s, TR=5 s, echo time=80 ms) was acquired for each tissue sample. The lactate resonance (1.31 ppm, doublet), n-Acetyl resonance associated with proteoglycans (PG) (2.04 ppm, singlet), and collagen breakdown region (col) (3.30-4.00 ppm) were analyzed to compare disc specimens. These regions are annotated in further detailed spectra sections shown in FIGS. 7A and 7B.

3. Results

FIGS. 7A, 7B show representative 80 ms $^1$H CPMG spectra of (a) discogenic pain patient and (b) patient with scoliosis. The proteoglycan n-Acetyl resonance (PG) lactate, and collagen breakdown region (col) are indicated.

Relative to deformity patients, those with back pain demonstrate significantly lower PG/Lactate and PG/col ratios ($p<0.05$; see FIG. 7). In addition, Table 2 shows a table of information related to the experiment performed that produced the exemplary spectra shown in FIGS. 7A, 7B.

4. Discussion

The results from this experiment indicate that biochemical markers are useful to characterize processes that correlate with discogenic pain. Previous studies report the influence of pH on proteoglycan synthesis and overall health. As lactate concentrations increase, the effective pH of disc material decreases due to the increase in free H+ in solution, which can hinder proteoglycan synthesis.

The direct causal relationship between lactate concentration and pain is previously unknown or explained in fine biochemical detail here with respect to the present Experiment. However, the beneficial use of lactate concentration in providing a statistical correlation to pain is demonstrated according to the methods performed and summarized here. This presents a substantially useful tool in diagnosing locality of pain, regardless of mechanism of physical correlation between the two parameters. The highly beneficial systems and methods herein described provide distinct benefit in allowing a non-invasive tool to correlate measured factors to pain, regardless of the particular biological "cause-and-effect" chemical or biological relationships underlying these results. Nonetheless, it is believed that increased lactate may stimulate nerve fibers in granulation tissue associated with disc healing. Further studies with larger numbers of clinically-relevant samples that are matched for degeneration stage may be conducted by one of ordinary skill based upon a review of this disclosure and other available information, and to further confirm these and other areas of interest in identifying and using spectroscopic markers for assessing biochemical degeneration and association with discogenic pain.

The following documents are herein incorporated in their entirety by reference thereto:
Keshari K R, Zektzer A S, Swanson M G, Majumdar S, Lotz J C, Kurhanewicz J. Characterization of intervertebral disc degeneration by high-resolution magic angle spinning (HR-MAS) spectroscopy. Magn Reson Med 2005; 53(3):519-527.

Maroudas A. The Biology of the Intervertebral Disc. In: Ghosh P, editor. The Biology of the Intervertebral Disc. Volume 2. Boca Raton: CRC Press; 1988. p Ch. 9.

Urban J P, Smith S, Fairbank J C. Nutrition of the intervertebral disc. Spine 2004; 29(23):2700-2709.

It is to be appreciated based upon the foregoing disclosure that NMR spectroscopy is useful to identify and characterize spinal disc material as to a corresponding degree of intervertebral disc degeneration, and in particular with direct and predictable, reproducible correlation to Thompson grades between discs. Accordingly, this represents one highly beneficial, and broad aspect of the present invention. One particular embodiment described in fine detail hereunder relates to use of high resolution magic angle spinning (HR-MAS) spectroscopy, shown in particular useful for explanted disc material observed in that diagnostic environment. However, other further, also highly beneficial embodiments also result, and represent further broad aspects disclosed hereunder, in regards to differentiating properties of living tissue in vivo. Such may be accomplished for example, either using other types of magic angle spinning systems specially adapted for use with living specimens, or by use of other NMR spectroscopy systems useful on patients and based upon suitably modified and adapted aspects and modes of the tools and methods taught hereunder.

By isolating high signal peaks for diagnostic pain correlation, as has been done here for example in Example 2 summarized above, such particular targets are considered to extend well from 11.7T MAS MRI tools and into equipment used directly with patients in clinical practice, e.g. 3 or 1.5T MRI equipment more typically used in clinical diagnosis. This may in particular be the case in the additional application of customized local coils for creating higher local fields along a region of interest, such as a particular region of lumbar spine for example.

Still further, it is to be appreciated that tissue samples may be taken from patients, such as through biopsies, and then run in laboratory equipment such as high field MRI machines, e.g. MAS NMR at 11.7T, for useful patient diagnosis according to the various systems and methods herein exemplified by way of the examples and description provided.

In addition, various exemplary chemicals and/or certain constituent factors thereof are herein described as targets of non-invasive diagnosis of medical conditions associated with tissues. It is appreciated that such chemical "factors" may include the identified chemical or molecular structure itself, or a portion thereof, or a metabolite, degradation product, or bi-product thereof to the extent correlative to the chemical identified. Moreover, the present disclosure deals with information that is produced by diagnostic tools and methods to indicate certain property(s) of tissue. Such property(s) may include for example pain or tissue degeneration themselves, respectively. Or, it may include another second property having correlation or causal link with such first property. For example, nociceptive nerves, related growth factors, certain types of inflammation, etc. may have causal links to either or both of pain and tissue degeneration. These may be the property directly indicated by the information produced by the present embodiments, whereas that indicated property further leads to additional useful diagnosis and conclusion as to the related pain or degeneration. It is also contemplated that pain and degeneration may be isolated results or targets of such diagnostic tools and methods herein described, and may furthermore be linked together in a combined result or target. Furthermore, degrees of such properties may be identified by the novel systems and methods herein described. This may lead to further results and conclusions as to spatial relationship of such property within a tissue, e.g. the location of a disc level, or portion of a disc (or other tissue structure), that is more painful or degenerated relative to other surrounding joints, levels, or areas of tissue. Such localization may be the nature of the useful information produced itself, or may be identified by further analysis and processing conducted upon the useful information produced.

Example 3

1. Introduction

The goal of this study is to extend prior experience, using quantitative high-resolution magic angle spinning (HR-MAS) NMR spectroscopy to accurately characterize biochemical markers in disc specimens harvested from patients undergoing surgery, to experience observing NMR spectra of similar chemical signature targets in discs preserved in larger anatomic specimens using a commercially available clinical MRI system and commercially available surface coils. NMR spectroscopy data to be acquired and evaluated was for discs of ex-vivo bovine and cadaveric spines positioned in commercially available head coils, and discs of a living patient using a commercially available surface-spine coil. Papain was injected into bovine discs studied. This was intended to induce chemical degradation of proteoglycan, in order to monitor change over time in related magnetic resonance signals, in order to observe differences in the related NMR spectral peaks using the clinical test equipment and methods.

2. Materials and Methods

All MRI examinations were performed on a 3 Tesla (3T) GE Excite Signa whole-body MR scanner. Spine samples were acquired for evaluating target intervertebral discs in bovine (n=4) and cadaveric (n=4) ex-vivo studies. The ex-vivo studies used a GE 8-channel transmit/receive (T/R) phased array (PA) head coil or a GE 8-channel T/R PA knee coil. The in-vivo patient evaluation was done using a GE 6-channel spine coil. Single voxel spectroscopy imaging was conducted using a short-echo point-resolved spectroscopy (PRESS) sequence (TE/TR=35/2000 ms, 256 repetitions, 1024 data points), including chemical shift-selected (CHESS) water suppression. Data analysis included combining the data from multiple channels and calculating the ration of spectroscopy peak height of certain targets to be evaluated, namely N-Acetyl, Choline (Cho), and carbohydrate (carb), and additional data was evaluated for Lactate (Lac).

For the bovine disc portion of the study, the discs were scanned before Papain injection, 4 hours and 4-5 days after papain injection. The papain injection was made to achieve the enzymatic degradation of the nuclear pulpsos. The solution was made by following the method described by Bradford (Spine 9:135-147).

Figure 21B:
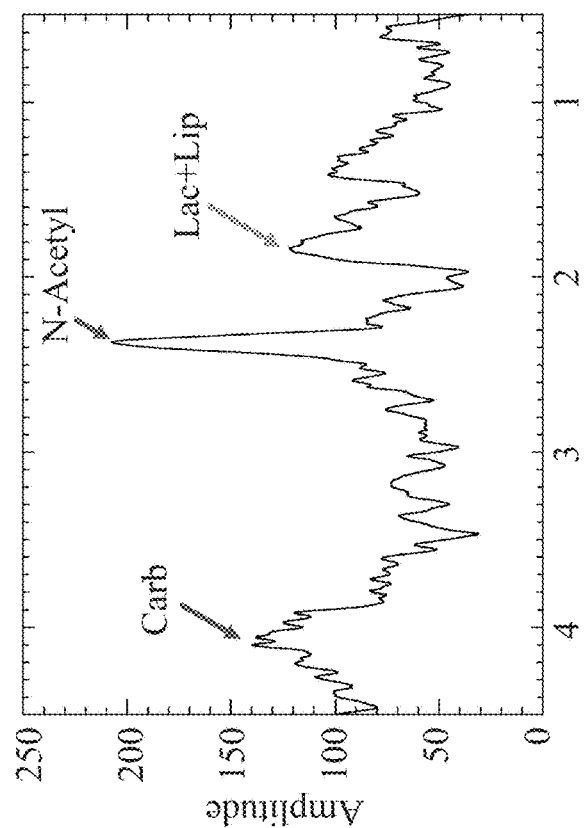
FIGS. 21A and 21B show a T2-weighted MRI image of a portion of a human patient's spine, and corresponding NMR spectrum of a voxel region in a disc nucleus of the spine, respectively, according to certain present embodiments.
Figure 21A:

The disc regions evaluated in the study are shown via voxel box overlay on MRI images of: a first bovine disc in FIGS. 8A, 9A, 10A, and 11A, of a second bovine disc in FIGS. 12A, 13A, 14A, and 15A; five cadaveric discs in FIGS. 16A, 17A, 18A, 19A, and 20A; respectively, and in-vivo patient discs in FIG. 21A. NMR spectra corresponding with each of these images, annotating the target peak spectral sections used for spectral evaluation, are shown in following corresponding FIGS. 8B, 9B, 10B, 11B, 12B, 13B, 14B, 15B, 16B, 17B, 18B, 19B, and 20B, respectively. Various Data Tables are provided for various peak ratios evaluated for the specimens in the study, as noted below.

3. Results

A. Ex-Vivo Bovine Spine Study

For bovine disc #1 in the study, the T2-weighted images acquired at time intervals (a) before Papain injection, (b) 4 hours, (c) 24 hours, and (d) 4-5 days after papain injection, are shown in FIGS. 8A, 9A, 10A, and 11A, with single voxel overlay shown for disc nucleus region of the NMR spectral image taken. The corresponding spectroscopy images taken at these time intervals are shown in FIGS. 8B, 9B, 10B, and 11B, respectively, with respective target peak regions evaluated in data analysis indicated by arrows on overlay. As shown in Table 3, data analysis for bovine disc #1 demonstrated that N-Acetyl/cho ratio decreases with time and cho/carb composite ratio increases with time. Since papain injection is believed to cause disc degeneration, the results agree with prior results of previous experiments comparing non-degenerated vs. degenerated ex-vivo human disc tissue samples using HR-MAS.

For bovine disc #2 in the study, the T2-weighted images acquired at time intervals (a) before Papain injection, (b) 1-2 hours after injection, (c) 24 hours after injection, and (d) 4-5 days after injection, are shown in FIGS. 12A, 13A, 14A, and 15A, with single voxel overlay shown for disc nucleus region of the NMR spectral image taken. The corresponding spectroscopy images taken at these time intervals are shown in FIGS. 12B, 13B, 14B, and 15B, respectively, with respective target peak regions evaluated in data analysis indicated by arrows on overlay. The 1-2 hour time interval data was not included in analysis as it is unknown whether 1-2 hours is enough time for papain to have significant effect on the disc tissue structures under evaluation. As shown in Table 4 for this bovine disc #2 of the study, the N-Acetyl/cho ratio substantially decreases, and the cho/carb composite ratio substantially increases, over the time associated with tissue degeneration in the disc sample. This confirms the experience with bovine disc #1 in the study, and the prior experience of previous studies using similar peak ratio comparisons between non-degenerated and degenerated ex-vivo human disc tissue samples using HR-MAS spectroscopy.

For bovine disc samples #3 and #4, only tabular results are shown of the various spectral peak ratios, in Tables 5 and 6, respectively. For these discs, another time point of 2 days after papain injection was added to further evaluate the experimental papain effects. At this time point, changes in the spectral ratios are not substantial as longer time points. However, as of the 5 day time point, the N-Acetyl/cho and Cho/carb peak ratios for these bovine disc samples #3 and #4 are observed to undergo substantial changes similar to those observed for bovine disc samples #1 and 2 in the study.

B. Ex-Vivo Cadaveric Spine Study

A cadaveric disc study was performed as follows. Five discs were targeted for use from five cadaveric spine samples. For the first cadaveric disc sample (reflected in T2-weighted image and single voxel spectral image in FIGS. 16A and B, respectively) this sample had a very low MRI signal and was excluded in the data analysis. Therefore, only the other four cadaveric discs intended for study were included in the analysis, indicated as cadaveric disc samples #1-4. T2-weighted images for these cadaveric discs #1-4 included in the analysis for this study are shown in FIGS. 17A, 18A, 19A, and 20A, with single voxel overlay shown for the disc nucleus region of NMR spectral image taken. The corresponding spectroscopy images taken at these time intervals are shown in FIGS. 17B, 18B, 19B, and 20B, respectively, with respective target peak regions evaluated in data analysis indicated by arrows on overlay. The number designation given to the test samples 1-4 were chosen in reverse order as to degree of their respective degradation as determined structurally per the T2-weighted MRI images (eg. Disc 1 being the most degradated, and Disc 4 being the least degradated in the sample population).

Table 7 shows similar spectral peak ratios analyzed for the cadaveric spine study as prior studies noted above. As indicated by bolded arrows in the first column, certain trends were apparent in each peak ratio presented between most to least degenerated discs per T2-weighted MRI image analysis. In particular, similar trends of N-Acetyl/cho and Cho/carb peak ratios were observed for the ex-vivo cadaver spine study as with prior bovine spine experience and prior HR-MAS disc tissue sample experience. More specifically, N-Acetyl/cho peak ratios were substantially lower, and below 1 indicating choline peak larger than N-Acetyl peak, for the more degradated Disc 1 and trending upward to N-Acetyl peak representing several multiple value to the choline peak for the most degradated Disc 4 among the samples. Similarly, the cho/carb peak ratios were substantially higher for the more degradated discs than the lower degradated discs, and in particular at the extremes comparing the respective data for Discs 1 and 4.

C. In Vivo Human Patient Study

A healthy patient volunteer executed informed consent to NMR spectroscopy data acquisition for purposes of this study during an MRI scan taken of the patient's spine for other purposes. A T2-weighted image for the patient's spine is shown in FIG. 21A, with single voxel overlay shown for the disc nucleus region of NMR spectral image taken. The corresponding spectroscopy image is shown in FIG. 21B, with respective target peak regions evaluated in data analysis indicated by arrows on overlay. Based upon the T2-weighted image, and absence of clinical symptoms associated with degeneration or pain, the disc imaged is considered to be representative sample of a relatively normal, healthy disc.

Table 8 shows the similar peak spectral ratios for this in-vivo patient disc as those analyzed in prior studies noted above. As illustrated in the NMR spectrum shown in FIG. 21B, the single voxel region imaged in the disc nucleus (box overlay in FIG. 21A) did not appear to produce a representative choline (cho) peak in the NMR spectrum imaged for the region. Accordingly, as shown in Table 8, the N-Acetyl/ cho peak ratio is shown as infinity, as the denominator is zero according to the absence of data in the NMR spectral data. Similarly, the cho/carb ratio is reflected in Table 8 as 0, again due to the absence of choline thus a zero value given to the absent peak.

The absence of choline is generally expected for typical normal healthy discs, as we have previously demonstrated that choline levels increase with disc degeneration. Choline is typically found in lipids that make up cell membranes and in the neurotransmitter acetylcholine. Consequently, the elevated choline levels noted in severely degenerated discs may represent increased cellularity associated with microvascularization and innervation, as compared with typical normal healthy discs. Thus, it is expected that a trend in NMR spectroscopy evaluation of normal healthy human discs should reveal the results reflected in the data shown for this pilot patient study. Based on our prior study with cadaveric tissues, there is an increasing presence of choline found in the NMR spectra imaged in increasingly degenerated discs, reflected in significantly decreased N-Acetyl/cho peak ratios and increased cho/carb peak ratios.

4. Discussion

The results from the study components included in this experiment confirm expected results of prior experiment conducted on non-degenerated and degenerated human disc tissue samples using HR-MAS spectroscopy. Trends in ratios between certain readily identifiable NMR spectral peaks known to represent N-Acetyl (generally associated with proteoglycan presence), choline (generally associated with cellularity), and carbohydrate, are confirmed to predictable outcomes in evaluating degeneration and as frequently associated with pain. The data analyzed in this study indicate that these peak ratios, and corresponding trends, can be readily evaluated using clinical MRI and local coil equipment. Each of four bovine spines evaluated in 3T MRI systems with local head and knee coils reflected similar identifiable changes in N-Acetyl/cho and cho/carb peaks under experimentally induced conditions believed to reasonably simulate general biochemical changes in the discs over a degenerative process. The one in-vivo human patient experience using a 3T MRI system and local spine coil reflected a predictable NMR spectral image of a normal healthy disc with respect to these particular peak ratios. This clinical experience confirms expected results from the prior ex-vivo experiments previously conducted.

5. Conclusion

The prior results analyzing NMR spectra of ex-vivo human spinal disc tissue samples using HR-MAS spectroscopy indicated that NMR spectral peak ratios associated with N-Acetyl/cho and cho/carb, and changes in those rates, demonstrate repeatable and predictable characteristics between generally normal healthy discs and degenerated discs. Experiments conducted on whole bovine and cadaver spine specimens using clinical 3T MRI systems with commercially available local head and knee coils confirmed these prior results. This confirming experience in larger portions of anatomy (eg. whole preserved spine sections vs. excised disc tissue specimens) as test samples, using commercially available clinical MRI systems and local coils, further indicates clinical utility of imaging disc degradation and pain via the NMR spectroscopy analysis presented. Further in-vivo study conducted on one living human patient using a clinical 3T MRI system and local spine coil further confirmed NMR spectroscopy results of these peak ratios expected for normal healthy discs according to the prior experience in the previous ex-vivo studies, in particular in relation to N-Acetyl/cho and cho/carb peak ratios. Based upon this initial experience with one normal healthy human disc, an expected increase in choline from such normal healthy discs to degenerated discs would result in an expected decrease and increase, respectively, in these ratios. Simple further data acquisition and analysis from more patients with varying degrees of disc degradation per T2-weighted MRI may be readily performed and expected to confirm the expected trends and utility of such analysis in patient diagnosis and care. This further indicates that NMR spectroscopy conducted in the manner presented here has clinical utility in non-invasive imaging and evaluation of disc degeneration, including as is believed to be associated with pain. In particular, this study confirms clinical utility using non-invasive NMR spectroscopy with a commercially available clinical 3T MRI system and commercially available clinical spine coil for determining localized extent of disc degradation in a spine. In particular, the NMR spectral peak ratios of N-Acetyl/cho and cho/carb provide useful data in making this determination in what is believed to be a predictable, repeatable manner in a non-invasive clinical diagnostic setting.

It is further appreciated that certain surface coils were evaluated among the studies conducted, with confirming results. Examples include head, knee, and spine surface coils. It is further appreciated that more invasive approaches, such as for example probe-based coils, may provide still further benefit and utility when incorporated with the several aspects of the present disclosure, including for example enhanced resolution and spatial sensitivity with increased signal to noise ratios with respect to target NMR spectral features to be evaluated. For example, certain probe-based coils have been previously incorporated for prostate cancer evaluation in clinical MRI systems.

The present disclosure, to the extent directed toward specified systems and devices of the embodiments, further contemplates respective methods related thereto, whether or not such method(s) are specifically described in detail aside from their contemplated use in the system disclosure. One of ordinary skill will understand such relationship based upon the totality of the disclosure provided herein. Similarly, methods disclosed hereunder further contemplate respective system and device aspects clearly contemplated by such disclosure, whether or not specific reference to such system or device aspects is provided in particular aside from the method description. The foregoing relates to the description provided hereunder, as well as the claims provided below. For example but without limitation, it is to be appreciated that certain functional aspects (or interco-operation described between elements) of system or apparatus claims provided herewith further contemplate the methods of performing such function as additional, independent aspects contemplated hereunder, though not necessarily to be applied as limitations to the particularly specified aspects and related modes and embodiments unless described expressly so.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

TABLE 1A

Disc Metabolite Ratios, Annulus Fibrosus

| Integrated Areas | Grade 1 | Grade 3 | Grade 5 | 1 vs 3 | 1 vs 5 | 3 vs 5 |
|---|---|---|---|---|---|---|
| N-Acetyl/Cho | 3.685 ± 0.601 | 2.552 ± 0.339 | 1.941 ± 0.540 | 0.006 | 0.035 | 0.035 |
| Cho/Carb | 0.115 ± 0.027 | 0.191 ± 0.014 | 0.243 ± 0.016 | <0.001 | <0.001 | <0.001 |
| N-Acetyl/Carb | 0.420 ± 0.137 | 0.487 ± 0.062 | 0.466 ± 0.096 | 0.277 | 0.486 | 0.638 |

TABLE 1B

Disc Metabolite Ratios, Nucleus Pulposus

| Integrated Areas | Grade 1 | Grade 3 | Grade 5 | 1 vs 3 | 1 vs 5 | 3 vs 5 |
|---|---|---|---|---|---|---|
| N-Acetyl/Cho | 5.487 ± 1.400 | 4.336 ± 0.706 | 2.364 ± 0.411 | 0.031 | <0.001 | 0.001 |
| Cho/Carb | 0.082 ± 0.018 | 0.121 ± 0.014 | 0.161 ± 0.006 | 0.001 | <0.001 | 0.001 |
| N-Acetyl/Carb | 0.448 ± 0.139 | 0.515 ± 0.049 | 0.380 ± 0.079 | 0.465 | 0.146 | 0.006 |

TABLE 2

Ratios of PG/lactate, PG/Col, and Lactate/Col + 1 std deviation

| | Disc Pain | Scoliosis |
|---|---|---|
| PG/Lactate | 0.37 ± 0.36 | 1.72 ± 0.81 |
| PG/col | 0.28 ± 0.14 | 0.65 ± 0.35 |
| Lactate/col | 0.70 ± 0.35 | 0.38 ± 0.08 |

TABLE 3

Ex-Vivo Bovine Disc #1; NMR Spectral Peak Ratios over time (Papain Injection)

| NMR Peak Ratios | Before Inject | 4 hrs after Inject | 24 hrs after Inject | 4 days after Inject |
|---|---|---|---|---|
| N-Acetyl/Lac + Lip ↓ | 4.88 | 2.52 | 2.65 | 1.64 |
| N-Acetyl/cho ↑ | 10.32 | 3.87 | 3.27 | 2.64 |
| Cho/carb | 0.31 | 0.43 | 0.53 | 0.82 |
| N-Acetyl/carb | 3.17 | 1.66 | 1.76 | 2.17 |

TABLE 4

Ex-Vivo Bovine Disc #2; NMR Spectral Peak Ratios over time (Papain Injection)

| NMR Peak Ratios | Before Inject | 1-2 hrs after Inject | 24 hrs after inject | 4 dys after inject |
|---|---|---|---|---|
| N-Acetyl/Lac + Li ↓ | 1.56 | 3.30 | 3.32 | 2.17 |
| N-Acetyl/cho ↑ | 7.65 | 7.69 | 3.10 | 2.90 |
| Cho/carb | 0.26 | 0.20 | 0.48 | 0.66 |
| N-Acetyl/carb | 1.97 | 1.56 | 1.48 | 1.91 |

TABLE 5

Ex-Vivo Bovine Disc #3; NMR Spectral Peak Ratios over time (Papain Injection)

| NMR Spectral Peak Ratios | before Injection | 24 hrs after Inject | 2 days after Inject | 5 days after Inject |
|---|---|---|---|---|
| N-Acetyl/Lac + Lip | 8.47 | 7.65 | 5.16 | 3.35 |
| N-Acetyl/cho ↓ | 4.23 | 3.31 | 4.13 | 2.05 |
| Cho/carb ↑ | 0.49 | 0.73 | 0.59 | 1.17 |
| N-Acetyl/carb | 2.07 | 2.42 | 2.45 | 2.40 |

TABLE 6

Ex-Vivo Bovine Disc #4; NMR Spectral Peak Ratios over time (Papain Injection)

| NMR Spectral Peak Ratios | Before Inject | 24 hrs after Inject | 2 days after Inject | 5 days after Inject |
|---|---|---|---|---|
| N-Acetyl/Lac + Lip | 2.38 | 2.26 | 3.66 | 4.25 |
| N-Acetyl/cho ↓ | 8.50 | 6.39 | 7.60 | 2.08 |
| Cho/carb ↑ | 0.17 | 0.54 | 0.33 | 0.77 |
| N-Acetyl/carb | 1.48 | 3.45 | 2.48 | 1.60 |

TABLE 7

Ex-Vivo Cadaver Discs #1-4; NMR Spectral Peak Ratios taken for Discs 1-4 (in reverse order of degree of degradation per structural analysis in T2-weighted MRI, eg. Disc 1 most degradated, Disc 4 least degradated); Arrows indicate trend in peak ratio values from Disc 1 to Disc 4.

| NMR Peak Ratios | Disc 1 | Disc 2 | Disc 3 | Disc 4 |
|---|---|---|---|---|
| N-Acetyl/Lac + Lip ↑ | 0.21 | 0.33 | 0.76 | 2.26 |
| N-Acetyl/cho* ↑ | 0.48 | 0.87 | 2.96 | 17.28 |
| Cho/carb* ↓ | 0.60 | 0.60 | 0.43 | 0.22 |
| N-Acetyl/carb ↑ | 0.28 | 0.52 | 1.27 | 3.88 |

TABLE 8

In-Vivo Human Patient Spine NMR Spectroscopy Study

| NMR Spectral Peak Ratios | Peak Ratio Values |
|---|---|
| N-Acetyl/Lac + Lip | 2.86 |
| N-Acetyl/cho | ∞ (expected to decrease w/disc degeneration) |
| Cho/carb | 0 (expected to increase w/disc degeneration) |

What is claimed is:

1. A medical diagnostic system for providing diagnostic information about a chemical environment in tissue from respective nuclear magnetic resonance (NMR) spectra generated and acquired for each of a first region of tissue and a second region of tissue of a patient, the system comprising:
an NMR spectroscopy system in a configuration that is operable to apply a magnetic pulse sequence to induce NMR signals in each of the first and second regions of tissue, and to acquire said NMR signals, to thereby generate first NMR spectroscopic data related to a first NMR spectrum from the first region of tissue and to generate second NMR spectroscopic data related to a second NMR spectrum from the second region of tissue;
a computer processor; and
computer-readable memory storing instructions in the form of a computer readable software program executable by the computer processor, wherein said instructions are configured to, when executed by the computer processor, cause the system to:
process a first spectral region between about 1.31 ppm and about 1.35 ppm of the first NMR spectroscopic data to determine a first spectral value for a first measured spectral parameter;
process a second spectral region between about 1.9 ppm and about 2.1 ppm of the first NMR spectroscopic data to determine a second spectral value for a second measured spectral parameter;
calculate a first property value for a chemical environment in the first region of tissue based on the first spectral value and the second spectral value;
process the first spectral region between about 1.31 ppm and about 1.35 ppm of the second NMR spectroscopic data to determine a third spectral value for a third measured spectral parameter;
process the second spectral region between about 1.9 ppm and about 2.1 ppm of the second NMR spectroscopic data to determine a fourth spectral value for a fourth measured spectral parameter;
calculate a second property value for a chemical environment in the second region of tissue based on the third spectral value and the fourth spectral value;
perform a comparison between the first property value and the second property value to determine a relative difference between the first property value and the second property value;
determine and provide the diagnostic information based at least in part on the relative difference from the comparison, wherein the diagnostic information is correlative to a difference between the chemical environments associated with a medical condition of the respective first and second regions of tissue; and
compare the first or second property value to a graded scale, wherein the diagnostic information is adapted to distinguish between grades of the graded scale.

2. The system of claim 1, wherein the diagnostic information comprises a determination of where nociceptive pain is being experienced between the first region of tissue and the second region of tissue based at least in part on the comparison of the first property value and the second property value.

3. The system of claim 1, wherein the first region of tissue comprises at least a portion of a first intervertebral disc and wherein the second region of tissue comprises at least a portion of a second intervertebral disc.

4. The system of claim 3, wherein the diagnostic information comprises a determination of whether nociceptive pain is occurring in the first region of tissue versus the second region of tissue.

5. The system of claim 1, wherein the first tissue region comprises a target tissue region, wherein the second tissue region comprises a reference tissue region, and wherein the instructions are configured to cause the system to determine the diagnostic information for the target tissue region.

6. The system of claim 1, wherein:
the first property value of the first region of tissue comprises a ratio between the first spectral value and the second spectral value; and
the second property value of the second region of tissue comprises a ratio between the third spectral value and the fourth spectral value.

7. The system of claim 1, wherein the NMR spectroscopy system comprises a local detector coil assembly in a configuration that is operable, in response to the applied magnetic pulse sequence, to acquire the NMR signals and generate the first NMR spectroscopic data related to the first NMR spectrum for the first region of tissue and to generate the second NMR spectroscopic data related to the second NMR spectrum for the second region of tissue.

8. The system of claim 7, wherein the NMR spectroscopy system comprises:
a first single voxel region prescribed to coincide with the first region of tissue in a first configuration, wherein the NMR spectroscopy system is operable in the first configuration to apply the magnetic pulse sequence to induce a first NMR signal at the first single voxel region and acquire a first portion of the NMR spectroscopic data from the first single voxel region via the local detector coil assembly; and
a second single voxel region prescribed to coincide with the second region of tissue in a second configuration, wherein the NMR spectroscopy system is operable in the second configuration to apply the magnetic pulse sequence to induce a first NMR signal at the first single voxel region and acquire a second portion the NMR spectroscopic data from the second single voxel region via the local detector coil assembly.

9. A method for providing diagnostic information about a chemical environment in tissue from respective nuclear magnetic resonance (NMR) spectra generated and acquired for each of a first region of tissue and a second region of tissue of a patient, the method comprising:
accessing first NMR spectroscopic data associated with a first NMR spectrum generated via acquired NMR signals induced in the first region of tissue via an NMR spectroscopy system;
accessing second NMR spectroscopic data associated with a second NMR spectrum generated via acquired NMR signals induced in the second region of tissue via the NMR spectroscopy system;

processing the first NMR spectroscopic data related to the first NMR spectrum to determine a first property value for a chemical environment of the first region of tissue, wherein the processing is performed by a computer processor executing program instructions stored on computer-readable memory that cause the computer processor to:

process a first spectral region between about 1.31 ppm and about 1.35 ppm of the first NMR spectroscopic data to determine a first spectral value for a first measured spectral parameter; and process a second spectral region between about 1.9 ppm and about 2.1 ppm of the first NMR spectroscopic data to determine a second spectral value for a second measured spectral parameter; and calculate the first property value for the chemical environment in the first region of tissue based on the first spectral value and the second spectral value;

processing the second NMR spectroscopic data related to the second NMR spectrum to determine a second property value for a chemical environment of the second region of tissue, wherein the processing is performed by the computer processor executing the program instructions to cause the computer processor to:

process the first spectral region between about 1.31 ppm and about 1.35 ppm of the second NMR spectroscopic data to determine a third spectral value for a third measured spectral parameter; and process the second spectral region between about 1.9 ppm and about 2.1 ppm of the second NMR spectroscopic data to determine a fourth spectral value for a fourth measured spectral parameter; and calculate the second property value for the chemical environment in the second region of tissue based on the third spectral value and the fourth spectral value;

performing a comparison between the first property value and the second property value to determine a relative difference between the first property value and the second property value, wherein the comparison is performed by the computer processor executing the program instructions; and determining and providing the diagnostic information based at least in part on the relative difference from the comparison, wherein the diagnostic information is correlative to a difference between the chemical environments associated with a medical condition of the respective first and second regions of tissue; and comparing the first or second property value to a graded scale, wherein the diagnostic information is adapted to distinguish between grades of the graded scale.

10. The method of claim 9, wherein the diagnostic information comprises a determination of where nociceptive pain is being experienced between the first region of tissue and the second region of tissue based at least in part on the comparison of the first property value and the second property value.

11. The method of claim 9, wherein the first region of tissue comprises at least a portion of a first intervertebral disc and wherein the second region of tissue comprises at least a portion of a second intervertebral disc.

12. The method of claim 11, wherein the diagnostic information comprises a determination of whether nociceptive pain is occurring in the first region of tissue versus the second region of tissue.

13. The method of claim 9, wherein the first tissue region comprises a target tissue region, wherein the second tissue region comprises a reference tissue region, and wherein the method comprises determining the diagnostic information for the target tissue region.

14. The method of claim 9, wherein:

the first property value of the first region of tissue comprises a ratio between the first spectral value and the second spectral value; and the second property value of the second region of tissue comprises a ratio between the third spectral value and the fourth spectral value.

15. The method of claim 9, comprising:

operating an NMR spectroscopy system to apply a magnetic pulse sequence to induce the NMR signals;

acquiring the induced NMR signals using a local detector coil assembly; and generating the first NMR spectroscopic data related to the first NMR spectrum for the first region of tissue and generating the second NMR spectroscopic data related to the second NMR spectrum for the second region of tissue from the acquired NMR signals.

16. The method of claim 15, comprising:

prescribing a first single voxel region to coincide with the first region of tissue in a first configuration, wherein the NMR spectroscopy system is operable in the first configuration to apply the magnetic pulse sequence to induce a first NMR signal at the first single voxel region and acquire a first portion of the NMR spectroscopic data from the first single voxel region via the local detector coil assembly; and prescribing a second single voxel region to coincide with the second region of tissue in a second configuration, wherein the NMR spectroscopy system is operable in the second configuration to apply the magnetic pulse sequence to induce a first NMR signal at the first single voxel region and acquire a second portion the NMR spectroscopic data from the second single voxel region via the local detector coil assembly.

17. Non-transitory computer readable media including computer-executable instructions that, when executed by a computer system, cause the computer system to at least:

access first NMR spectroscopic data associated with a first NMR spectrum generated via acquired NMR signals induced in a first region of tissue via an NMR spectroscopy system;

access second NMR spectroscopic data associated with a second NMR spectrum generated via acquired NMR signals induced in a second region of tissue via the NMR spectroscopy system;

process a first spectral region between about 1.31 ppm and about 1.35 ppm of the first NMR spectroscopic data to determine a first spectral value for a first measured spectral parameter;

process a second spectral region between about 1.9 ppm and about 2.1 ppm of the first NMR spectroscopic data to determine a second spectral value for a second measured spectral parameter;

calculate a first property value for a chemical environment in the first region of tissue based on the first spectral value and the second spectral value;

process the first spectral region between about 1.31 ppm and about 1.35 ppm of the second NMR spectroscopic data to determine a third spectral value for a third measured spectral parameter;

process the second spectral region between about 1.9 ppm and about 2.1 ppm of the second NMR spectroscopic data to determine a fourth spectral value for a fourth measured spectral parameter;

calculate a second property value for a chemical environment in the second region of tissue based on the third spectral value and the fourth spectral value;

perform a comparison between the first property value and the second property value to determine a relative difference between the first property value and the second property value;

determine and provide diagnostic information based at least in part on the relative difference from the comparison, wherein the diagnostic information is correlative to a difference between the chemical environments associated with a medical condition of the respective first and second regions of tissue; and compare the first or second property value to a graded scale, wherein the diagnostic information is adapted to distinguish between grades of the graded scale.

18. The computer readable media of claim 17, wherein the first region of tissue comprises at least a portion of a first intervertebral disc, and wherein the diagnostic information comprises a pain determination.

\* \* \* \* \*